United States Patent [19]
Kasperchik

[11] Patent Number: 6,059,868
[45] Date of Patent: May 9, 2000

[54] INK-JET INKS WITH IMPROVED PERFORMANCE

[75] Inventor: Vladek Kasperchik, Corvallis, Oreg.

[73] Assignee: Hewlett-Packard Company, Palo Alto, Calif.

[21] Appl. No.: 09/182,826

[22] Filed: Oct. 29, 1998

[51] Int. Cl.[7] ........................................ C09D 11/00
[52] U.S. Cl. .................... 106/31.27; 106/31.43; 106/31.6; 106/31.75
[58] Field of Search .............................. 106/31.27, 31.6, 106/31.43, 31.75

[56] References Cited

U.S. PATENT DOCUMENTS

| | | |
|---|---|---|
| 3,776,742 | 12/1973 | Sanders . |
| 4,761,180 | 8/1988 | Askeland et al. . |
| 4,786,327 | 11/1988 | Wenzel et al. . |
| 4,963,189 | 10/1990 | Hindagolla . |
| 5,061,316 | 10/1991 | Moffatt . |
| 5,062,893 | 11/1991 | Adamic et al. . |
| 5,085,698 | 2/1992 | Ma et al. . |
| 5,106,416 | 4/1992 | Moffatt et al. . |
| 5,108,503 | 4/1992 | Hindagolla et al. . |
| 5,116,409 | 5/1992 | Moffatt . |
| 5,133,803 | 7/1992 | Moffatt . |
| 5,181,045 | 1/1993 | Shields et al. . |
| 5,188,664 | 2/1993 | Adamic et al. . |
| 5,198,023 | 3/1993 | Stoffel . |
| 5,272,201 | 12/1993 | Ma et al. . |
| 5,279,652 | 1/1994 | Kaufmann et al. . |
| 5,320,668 | 6/1994 | Shields et al. . |
| 5,342,439 | 8/1994 | Lauw . |
| 5,428,383 | 6/1995 | Shields et al. . |
| 5,431,724 | 7/1995 | Adamic et al. ................. 106/31.75 |
| 5,443,630 | 8/1995 | von der Eltz et al. . |
| 5,448,402 | 9/1995 | Shields et al. . |
| 5,462,592 | 10/1995 | Murakami et al. . |
| 5,514,208 | 5/1996 | Nagai et al. . |
| 5,534,051 | 7/1996 | Lauw . |
| 5,536,306 | 7/1996 | Johnson et al. . |
| 5,554,213 | 9/1996 | Radigan, Jr. et al. . |
| 5,609,674 | 3/1997 | Brown et al. . |
| 5,611,847 | 3/1997 | Guistina et al. . |
| 5,626,655 | 5/1997 | Pawlowski et al. . |
| 5,679,143 | 10/1997 | Looman . |

(List continued on next page.)

FOREIGN PATENT DOCUMENTS

| | | |
|---|---|---|
| 0437078A1 | 7/1991 | European Pat. Off. . |
| 0812888A2 | 12/1997 | European Pat. Off. . |
| 0755984B1 | 4/1998 | European Pat. Off. . |
| 57-5772 | 6/1980 | Japan . |
| 58-2364 | 1/1983 | Japan . |
| 4-293378 | 3/1991 | Japan . |
| 6-33006 | 2/1994 | Japan . |
| 2147003A | 5/1995 | United Kingdom . |

OTHER PUBLICATIONS

Hewlett–Packard Product Safety Information Sheet, Aug. 1, 1997, (HP 51641A).

Hewlett–Packard Product Safety Information Sheet, Jun. 1, 1998 (HP C4801A / C4802A / C4803A printheads and HP C4841A / C4842A / C4843A ink cartridges for the HP 2000C printer).

*Primary Examiner*—Helene Klemanski
*Assistant Examiner*—Veronica F. Faison

[57] ABSTRACT

Ink-jet liquids, and ink-jet liquid sets, and the method for using the same, are provided wherein the one of the liquids comprises an aqueous vehicle; and a decel-alleviating component, wherein the decel-alleviating component is a liquid-soluble compound having a cationic component and an anionic component, the decel-alleviating component being capable of undergoing rapid thermal decomposition upon heating. The present formulations are used to formulate ink-jet liquids, and more particularly, to provide enhanced drop ejection performance, such as decel alleviation, when the liquid contains a precipitating agent, such as, a multi-valent metal compound such as a metal salt or metal coordination compound, and more particularly, when the liquid contains both a multi-valent metal salt and a colorant.

30 Claims, 15 Drawing Sheets

U.S. PATENT DOCUMENTS

| | | | |
|---|---|---|---|
| 5,706,042 | 1/1998 | Takeyama et al. | 106/31.43 |
| 5,721,344 | 2/1998 | Beattig . | |
| 5,730,789 | 3/1998 | Botros | 106/31.43 |
| 5,772,742 | 6/1998 | Wang . | |
| 5,785,743 | 7/1998 | Adamic et al. . | |
| 5,792,249 | 8/1998 | Shirota et al. . | |
| 5,824,785 | 10/1998 | Baettig et al. . | |

INK-JET INKS WITH IMPROVED PERFORMANCE

FIELD OF INVENTION

The present invention relates to ink-jet liquids, and, more particularly, to liquids with improved performance for use in ink-jet printing.

BACKGROUND OF INVENTION

Printing liquids are used in many applications such as painting, gravure and press printing, xerographic printing using liquid toners, and ink-jet printing. Printing liquids typically comprise a colorant in a liquid media or vehicle. Examples include paints, liquid toners, and inks. The vehicle may be organic-based (solvent-based) or water-based (aqueous-based). The colorant may be dye or pigment. The printing liquid may further include additional ingredients based on the particular application.

Ink-jet printing is a non-impact printing process in which droplets of ink are deposited on print media, such as paper, transparency film, or textiles. Essentially, ink-jet printing involves the ejection of fine droplets of ink onto print media in response to electrical signals generated by a microprocessor.

There are two basic means currently available for achieving ink droplet ejection in ink-jet printing: thermally and piezoelectrically. In thermal ink-jet printing, the energy for drop ejection is generated by electrically-heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezoelectric crystals, again, in response to electrical signals generated by the microprocessor. The ejection of ink droplets in a particular order forms alphanumeric characters, area fills, and other patterns on the print medium.

Ink-jet printers offer low cost, high quality printing with relatively noise-free operation. As such, ink-jet printers have become a popular alternative to other types of printers.

In general, a successful ink set for color ink-jet printing should have the following properties: good crusting resistance, good stability, proper viscosity, proper surface tension, good color-to-color bleed alleviation, rapid dry time, no negative reaction with the vehicle, consumer-safety, good permanence (e.g., smearfastness, lightfastness, waterfastness), and low strike-through. When placed into a thermal ink-jet system, the ink set should also be kogation-resistant and have stable drop ejection performance (e.g. little or no drop velocity degradation over the time).

Regardless of whether an ink is dye-based or pigment-based, ink-jet inks commonly face the challenge of color-to-color or black-to-color bleed control. The term "bleed," as used herein, is defined to be the invasion of one color into another, once the ink is deposited on the print medium, as evidenced by a ragged border therebetween. Bleed occurs as colors mix both on the surface of the paper substrate as well as within the substrate itself. The occurrence of bleed is especially problematic between a black ink and an adjacently-printed color ink because it is all the more visible. Hence, to achieve good print quality, bleed should be substantially reduced or eliminated such that borders between colors are clean and free from the invasion of one color into the other. Several approaches have been utilized in controlling bleed between the printed images, many of which utilize reactive ink mechanisms.

Various solutions to the problem of black to color and color to color bleed have been proffered. Some solutions involve changing the ink environment to reduce bleed. For instance, heated platens and other heat sources, along with specially formulated paper, have been employed to reduce bleed. However, heated platens add cost to the printer, and specially formulated paper is more expensive than "plain" paper. Thus, using external paraphernalia to reduce bleed in ink-jet color printing is generally not cost effective. Another commonly employed method for reducing bleed involves the use of bleed control algorithms in ink-jet printers to provide borders between colors that are clean and free from the invasion of one color into another; however, such algorithms slow down the printer.

Other proposed solutions to the problem of bleed involve changing the composition of an ink-jet ink. For example, surfactants have been effectively used to reduce bleed in dye-based ink formulations; see, e.g., U.S. Pat. No. 5,106,416 entitled "Bleed Alleviation Using Zwitterionic Surfactants and Cationic Dyes," issued to John Moffatt et al., U.S. Pat. No. 5,116,409 entitled "Bleed Alleviation in Ink-Jet Inks", issued to John Moffatt, and U.S. Pat. No. 5,133,803 entitled "High Molecular Weight Colloids Which Control Bleed", issued to John Moffatt, all assigned to the same assignee as the present application. However, surfactants increase the penetration rate of the ink into the paper, which may also result in the reduction of edge acuity. Moreover, the addition of surfactant-containing inks could cause puddles on the nozzle plates of the printhead, leading to poor drop ejection characteristics. Other solutions specific to dye-based ink compositions, disclosed in patents assigned to the present assignee, are found in U.S. Pat. No. 5,198,023, entitled "Cationic Dyes with Added Multi-Valent Cations to Reduce Bleed in Thermal Ink-Jet Inks," issued to John Stoffel; U.S. Pat. No. 5,181,045, entitled "Bleed Alleviation Using pH Sensitive Dyes," issued to James Shields et al.; and U.S. Pat. No. 5,428,383, entitled "Method and apparatus for preventing color bleed in a multi-ink printing system," issued to Shields et. al.,"; all assigned to the same assignee as the present application.

Shields et. al., U.S. Pat. No. 5,428,383 discloses a method for printing multi-color images on a substrate in which color bleed between adjacent colored regions is controlled by providing a first ink composition comprising a first colorant; providing a second ink composition comprising a second colorant and a precipitating agent which will react with the first colorant in the first ink composition in order to form a precipitate therefrom; applying the first ink composition to the substrate in a first region thereon; applying the second ink composition to the substrate in a second region thereon, the second region being directly adjacent to and in contact with the first region; and reacting the precipitating agent in the second ink composition with the first colorant in the first ink composition at a position on the substrate where the first region contacts the second region so that the precipitate is formed at the position in order to prevent color bleed between the first ink composition in the first region and the second ink composition in the second region.

At times, formulating liquids with enhanced print quality performance, such as bleed performance, leads to degradation in printability and reliability performance.

Therefore, a need exists for an ink-jet liquid with enhanced bleed alleviation while maintaining good reliability and pen performance.

DISCLOSURE OF INVENTION

In accordance with the invention, an ink-jet liquid, an ink-jet liquid set, and the method for using the same are provided, wherein the one of the liquids comprises an aqueous vehicle; and a decel-alleviating component, wherein the decel-alleviating component is a liquid-soluble compound having a cationic component and an anionic component, the decel-alleviating component being capable of undergoing rapid thermal decomposition upon heating.

DETAILED DESCRIPTION OF THE INVENTION

Figure 1A:
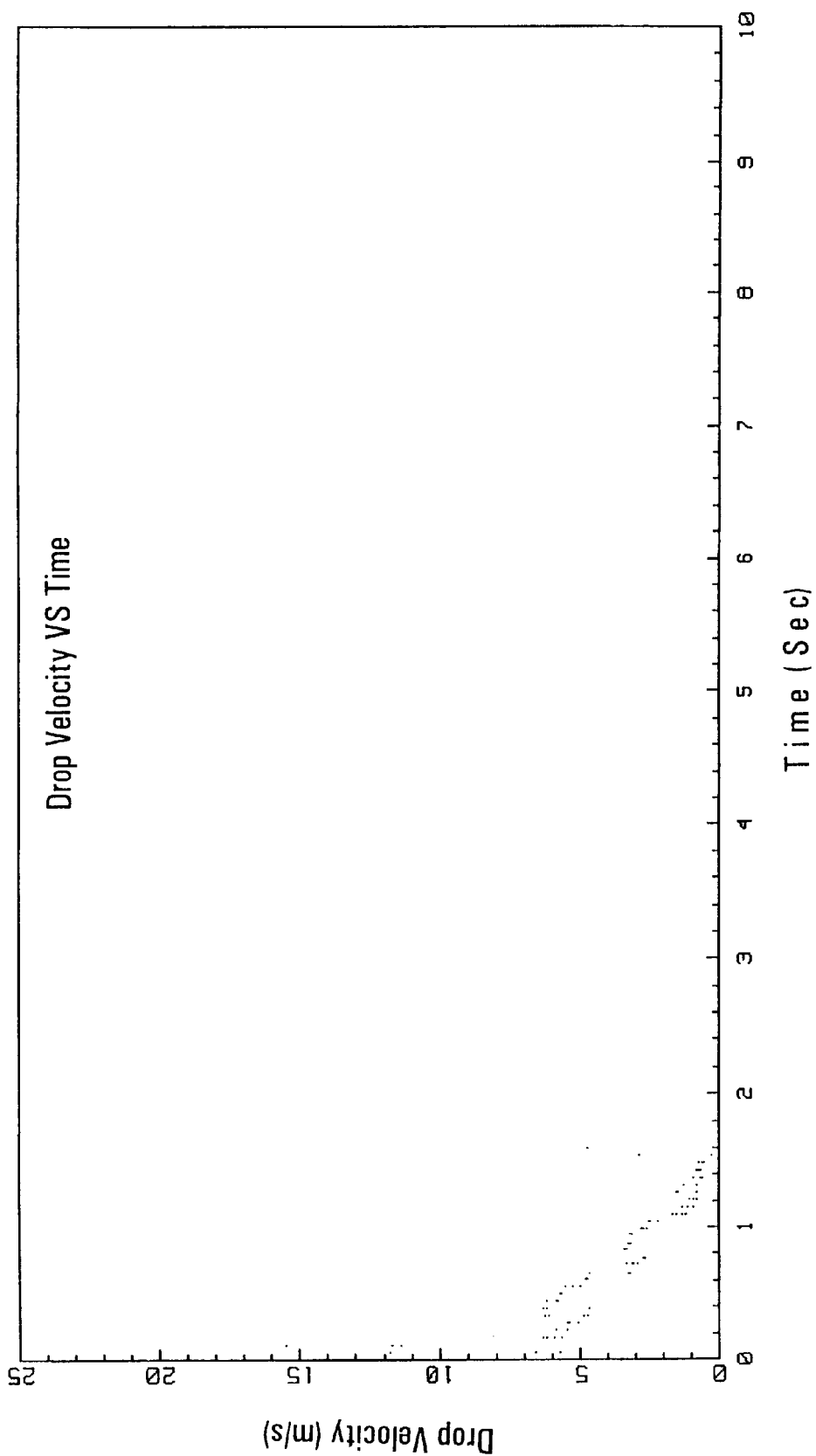
FIG. 1(a) is a plot of drop velocity versus time for a yellow ink containing no decel-alleviating component, exhibiting decel.

The ink-jet liquids, including inks, and methods for using the same of the present invention will enable the production of high quality prints while maintaining high ink-jet drop ejection performance, particularly, alleviation of decel.

As used herein, the term liquid includes either or both inks, and clear liquids not containing colorants.

The present formulations are used to formulate ink-jet liquids, and more particularly, to provide enhanced drop ejection performance, such as decel (rapid drop velocity degradation during continuous operation of the firing resistor), when the liquid contains a precipitating agent, such as, a multi-valent metal compound such as a metal salt or metal coordination compound, and more particularly, when the liquid contains both a multi-valent metal salt and a colorant.

As described above, the use of precipitating agents, among other forms of reactive chemistry, may be employed to enhance any one of a number of print quality attributes, such as, but not limited to: bleed control between two adjacently printed areas when one area is printed with at least the first liquid and the other area is printed with at least the second ink; or when an area is printed, at least partially, with at least the first liquid and at least the second ink. It should also be appreciated that the liquids and liquid sets formulated according to the present invention, and methods using the same, can be employed in printing adjacent areas and in situations when an area is under or over-printed with the liquids employing the present invention.

As used herein the term colorant includes dyes and pigments; and the term pigment refers to a colorant that is insoluble in the aqueous vehicle, and includes disperse dyes, self-stabilized pigments, and pigments dispersed with the aid of a dispersing agent.

In a typical application, the liquid containing the multi-valent metal is used as a first liquid, preferably an ink, to bring about the immobilization of a colorant in a second ink, wherein the colorant in the second ink comprises at least one second colorant having a functional group that upon contact, for example on the print medium, with the first liquid, can associate to form an insoluble salt, complex, or compound; with the metal, thereby immobilizing the second colorant in the second ink.

All concentrations herein are in weight percent of total ink composition, unless otherwise indicated. The purity of all components is that employed in normal commercial practice for ink-jet inks.

Each liquid, comprises an aqueous vehicle, and optionally additional components, as described below.

Aqueous Vehicle

The aqueous carrier medium is water or a mixture of water and at least one water-soluble organic solvent. Selection of a suitable mixture depends on requirements of the specific application, such as desired surface tension and viscosity, the selected colorant, drying time of the ink, and the type of substrate onto which the ink will be printed. Representative water-soluble organic solvents that may be selected are disclosed in U.S. Pat. No. 5,085,698. A mixture of water and a polyhydric alcohol, such as diethylene glycol, is preferred as the aqueous carrier medium.

In the case of a mixture of water and at least one water-soluble solvent, the aqueous carrier medium usually comprises from about 30% to about 95% water. The preferred compositions are about 60% to about 95% water, based on the total weight of the aqueous carrier medium.

The amount of aqueous carrier medium in the ink is in the range from about 70 to about 99.8%, preferably from about 94 to about 99.8%, based on total weight of the ink when an organic pigment is selected; from about 25 to about 99.8%, preferably from about 70 to 99.8%, based on total weight of the ink when an inorganic pigment is selected; and from about 80 to about 99.8% when a dye is selected as the colorant.

First Liquid

The first liquid comprises an aqueous vehicle, a precipitating agent, a decel-alleviating component, and preferably, further comprises at least one first colorant.

Precipitating agent

The precipitating agent is of a type which upon contact (for example on the print medium) reacts with the anionic group (e.g., the anionic group such as carboxyl or sulfonate) associated with a colorant (such as a dye, or a self-stabilized pigment, or the anionic group on a dispersant associated with a dispersed pigment) in an ink composition to form an insoluble salt, complex, or compound. In a preferred embodiment, the precipitating agent will comprise of a multi-valent metal compound, such as a metal salt or metal coordination compound, preferably a metal salt. Exemplary multi-valent metal cations suitable for use in the multi-valent metal compound include the following cations listed below in Table I:

TABLE I

| Multi-valent metal cation groups | Multi-valent metal cations |
| --- | --- |
| Transition metals | $Cr^{+3}$, $Mn^{+2}$, $Fe^{+2}$, $Fe^{+3}$, $Co^{+3}$, $Ni^{+2}$, $Cu^{+2}$, $Zn^{+2}$, $Y^{+3}$, $Cd^{+2}$ |
| Group IIA metals | $Mg^{+2}$, $Ca^{+2}$, $Sr^{+2}$, $Ba^{+2}$ |
| Group IIIA metals | $Al^{+3}$, $Ga^{+3}$, $In^{+3}$ |
| Lanthanoid metals | $La^{+3}$, $Pr^{+3}$, $Nd^{+3}$, $Sm^{+3}$, $Eu^{+3}$, $Gd^{+2}$, $Tb^{+3}$, $Dy^{+2}$, $Ho^{+3}$, $Er^{+3}$, $Tm^{+3}$, $YB^{+3}$, $Lu^{+3}$ |

Preferred metal cations suitable for use in the multi-valent metal compound include, but are not limited to, $Zn^{+2}$, $Mg^{+2}$, $Ca^{+2}$, $Cu^{+2}$, $Co^{+2}$, $Ni^{+2}$, $Fe^{+2}$, $La^{+3}$, $Nd^{+3}$, $Y^{+3}$, and $Al^{+3}$. Exemplary anions which may be coupled with these cations include but are limited to $NO_3^-$, $F^-$, $Cl^-$, $Br^-$, $I^-$, $CH_3COO^-$, and $SO_4^{-2}$.

Furthermore, the metal compound may be a metallic coordination compound. The metallic coordination compound generally refers to compounds in which a metallic ion is surrounded by an electron donor, i.e. ligand, which is capable of coordinating with the metallic ion. Elements composing the ligand, which are capable of coordinating with the metallic ion, are limited to the group V and VI elements in the periodic table. Typical elements are N, O, P, and S. Metallic coordination compounds containing nitrogen and oxygen atoms in the ligand are preferably used in the present invention.

The ligands composed of these elements are classified into two categories: unidentate ligands having one electron donor group per ligand or molecule, and multidentate ligands having two or more electron donor groups per ligand or molecule. Table II shows examples of ligands classified by the coordination number.

TABLE II

| Coordination Number | Ligand |
| --- | --- |
| 1 | Ammonia |
| 1 | Water |
| 1 | Acetic acid |
| 1 | Halogens |
| 2 | Glycine |
| 2 | Ethylenediamine |
| 2 | Propylenediamine |
| 2 | Lactic acid |
| 3 | Iminodiacetic acid |
| 3 | Diethylenetriamine |
| 4 | Dihydroxyethylglycine |
| 4 | Hydroxyethyliminodiacetic acid |
| 4 | Nitrilotriacetic acid |
| 5 | Ethylenediaminetetraacetic acid |
| 5 | Hydroxyethylethylenediaminetetraacetic acid |
| 6 | Diethylenetriaminepentaacetic acid |
| 7 | Triethylenetetraminehexaacetic acid |

Among these, metallic coordination compounds having ligands of a coordination number of 2 or more are desirably used in the present invention. Preferred metallic coordination compounds have ligands of a coordination number of 3 or more. However, any other metallic coordination compound having a ligand of a coordination number of 2 or more, other than compounds shown in Table II, may also be suitably used without restriction.

Accordingly, preferred multi-valent metal salts derived from the above-described cations and anions include but are not limited to: $Ca(NO_3)_2$, $CaCl_2$, $Ca(CH_3COO)_2$, $Al(NO_3)_3$, $Nd(NO_3)_3$, $Y(NO_3)_3$, $Cu(NO_3)_2$, $CuCl_2$, $CoCl_2$, $Co(NO_3)_2$, $NiCl_2$, $Ni(NO_3)_2$, $MgCl_2$, $MgBr_2$, $MgSO_4$, $Mg(CH_3COO)_2$, and $Mg(NO_3)_2$. It should be noted that other multi-valent metal salts derived from the above-listed cations and anions may also be prepared and used in the manner described herein. However, when selecting the appropriate multi-valent metal salt, the exercise of basic chemical techniques will dictate which compounds are most appropriate and which are not. For example, it is well known in the art that $AlCl_3$ produces a violent reaction when combined with water (e.g. the production of HCl gas). Thus, a reasonable and skilled chemist would conclude that this material would not be especially desirable for use in the present invention. Likewise, the desirability of other multi-valent metal salts or coordination compound may also be determined in this manner. It should further be noted that in certain instances, the pH of the first liquid may be adjusted, depending on the specific metal compound, e.g. metal salt, being used in the first liquid. Specifically, a side reaction may occur in which the metal cations in the first liquid form insoluble metal hydroxides if the pH of the first liquid is too high. Preliminary pilot tests with the selected liquid compositions will provide an indication as to whether this situation will occur. If necessary, the side reaction may be controlled by adjusting the pH of the first liquid downward using a selected acid (e.g. $HNO_3$). The amount and type of pH adjusting agent, as well as the general need for pH adjustments with respect to the first liquid are all determined using pilot tests as noted above, in conjunction with the exercise of routine chemical procedures which are well known in the art.

In a preferred embodiment the first liquid will comprise from about 0.3 to about 40% by weight multi-valent metal compound, preferably, from about 1 to about 15%, and most preferably from about 0.5 to about 5%.

Decel-Alleviating Component

Figure 1B:
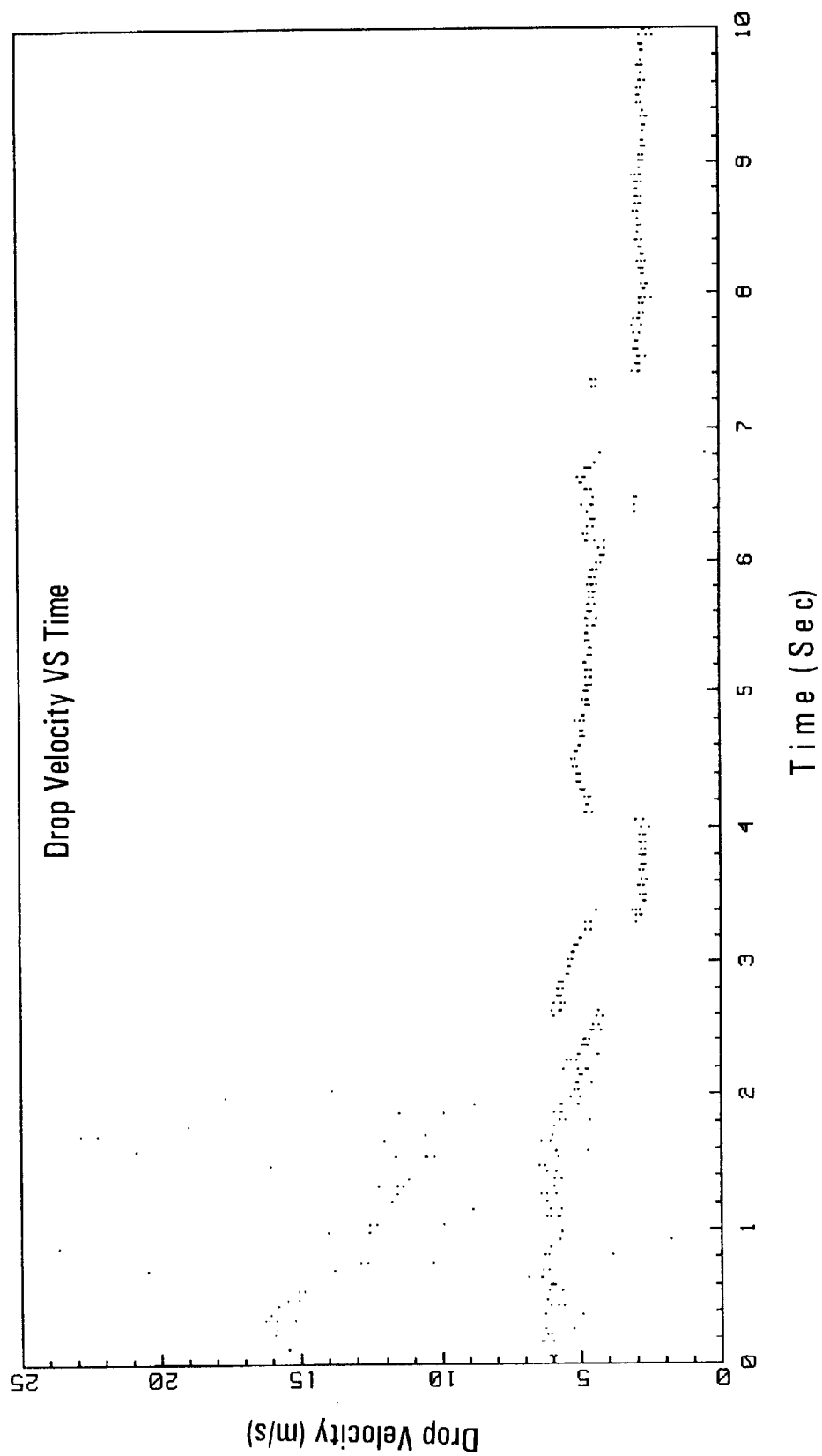
FIG. 1(b) is a plot of drop velocity versus time for a yellow ink containing $NH_4NO_3$ with an effective concentration of 0.25%, depicting an improvement in decel-alleviation.
Figure 1C:
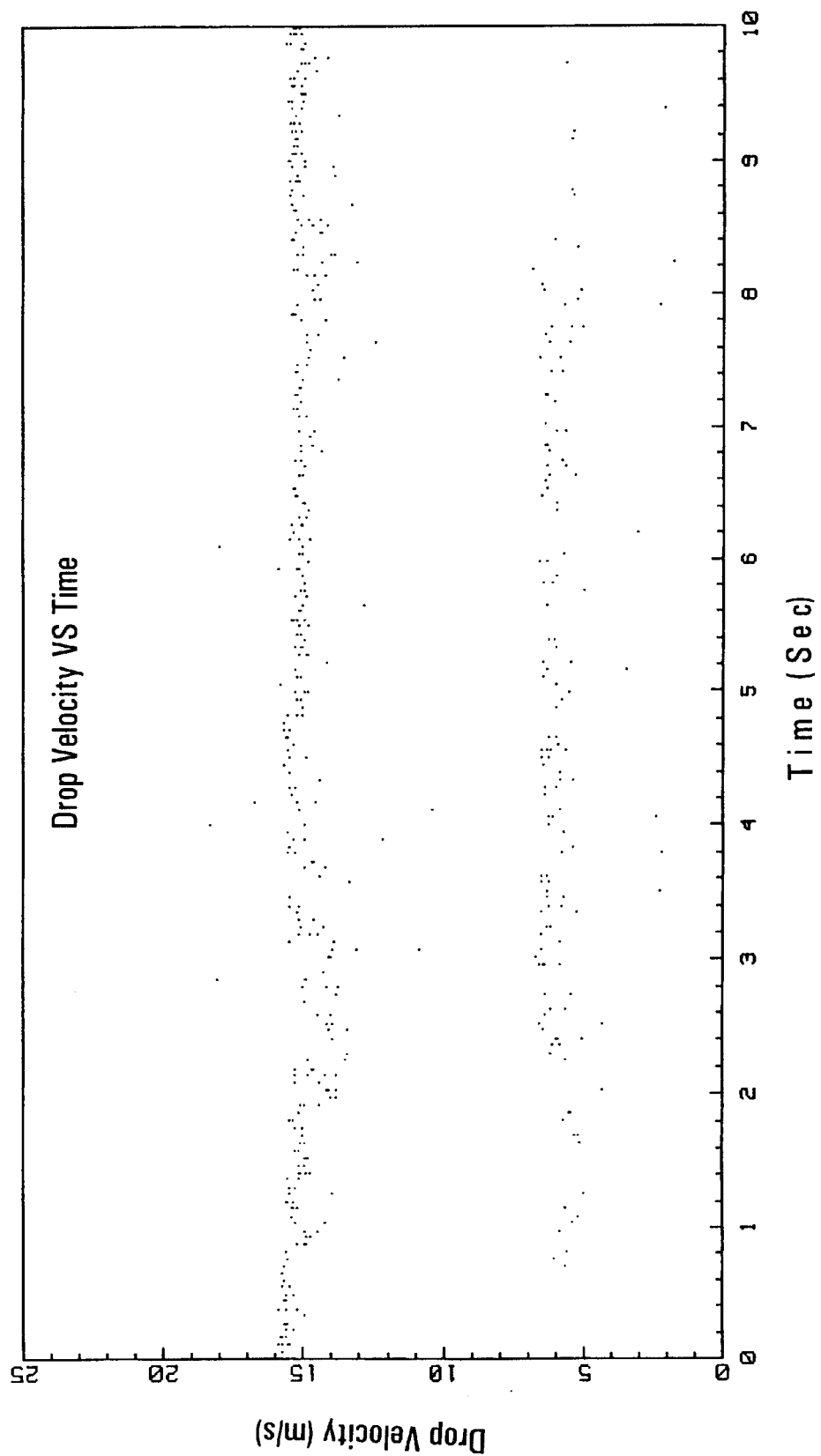
FIG. 1(c) is a plot of drop velocity versus time for a yellow ink containing $NH_4NO_3$ with an effective concentration of 0.5%, depicting an improvement in decel-alleviation.
Figure 2A:
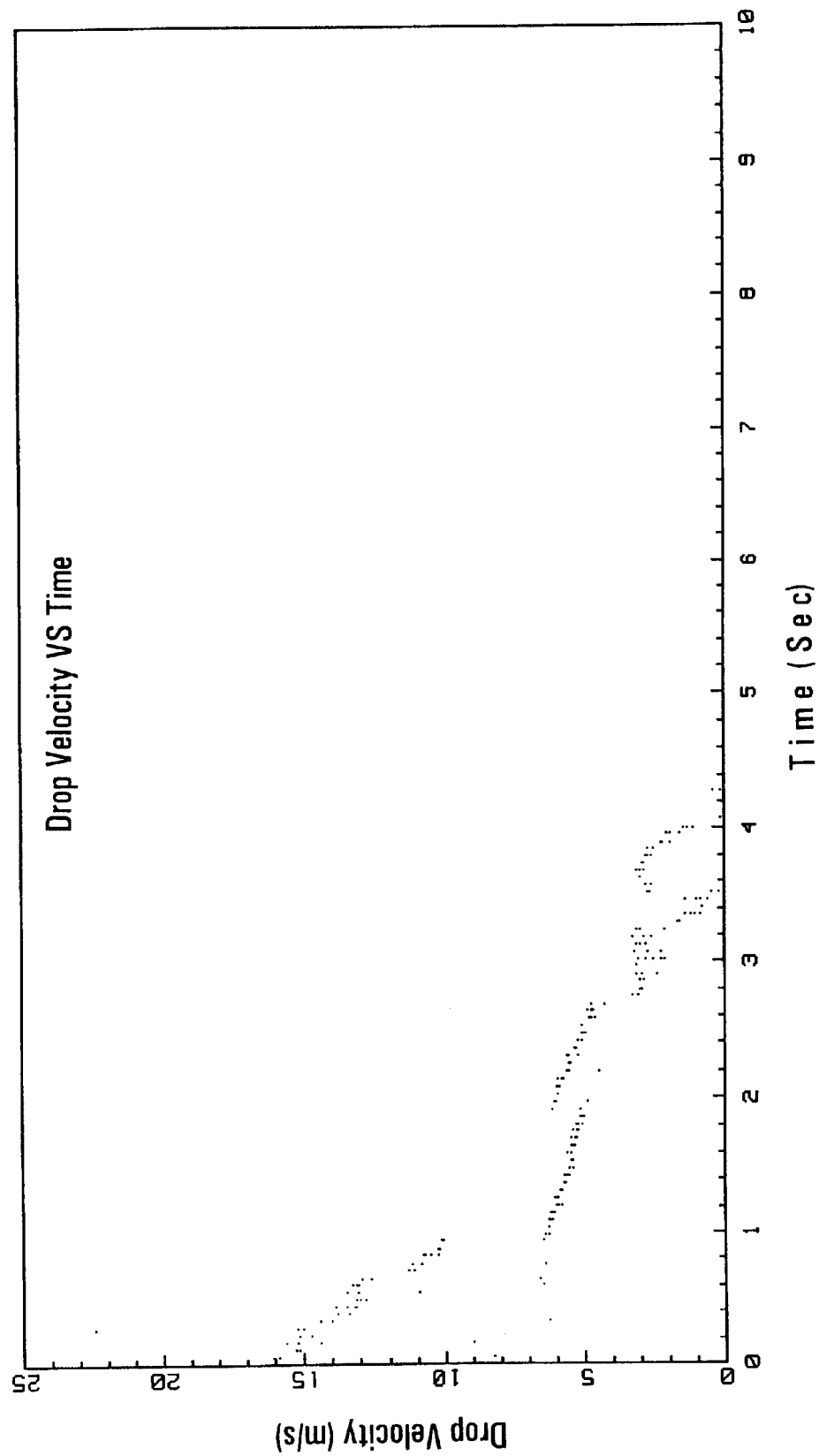
FIG. 2(a) is a plot of drop velocity versus time for a magenta ink containing no decel-alleviating component, exhibiting decel.
Figure 2B:
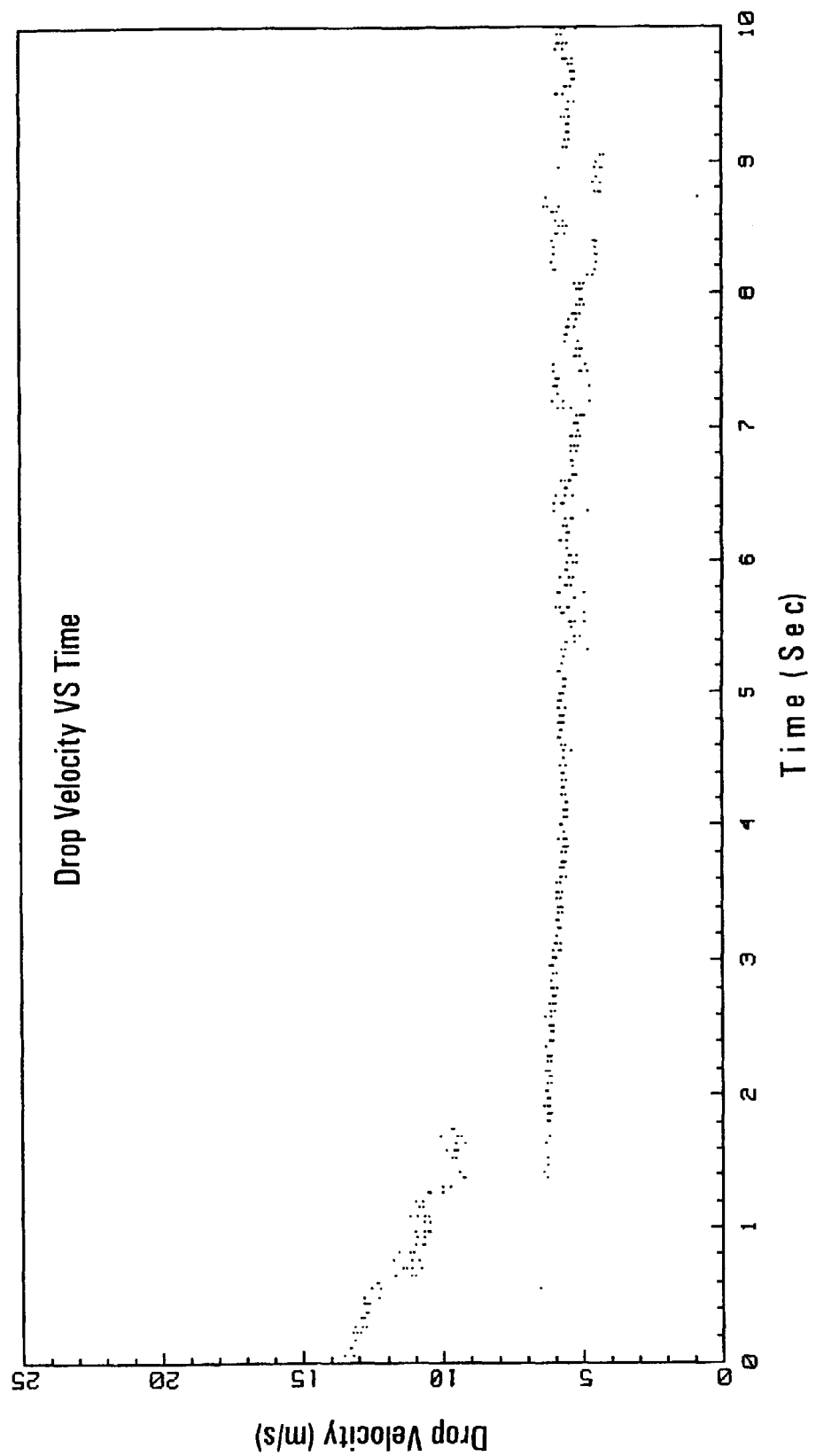
FIG. 2(b) is a plot of drop velocity versus time for a magenta ink containing $NH_4NO_3$ with an effective concentration of 0.1%, depicting an improvement in decel-alleviation.
Figure 2C:
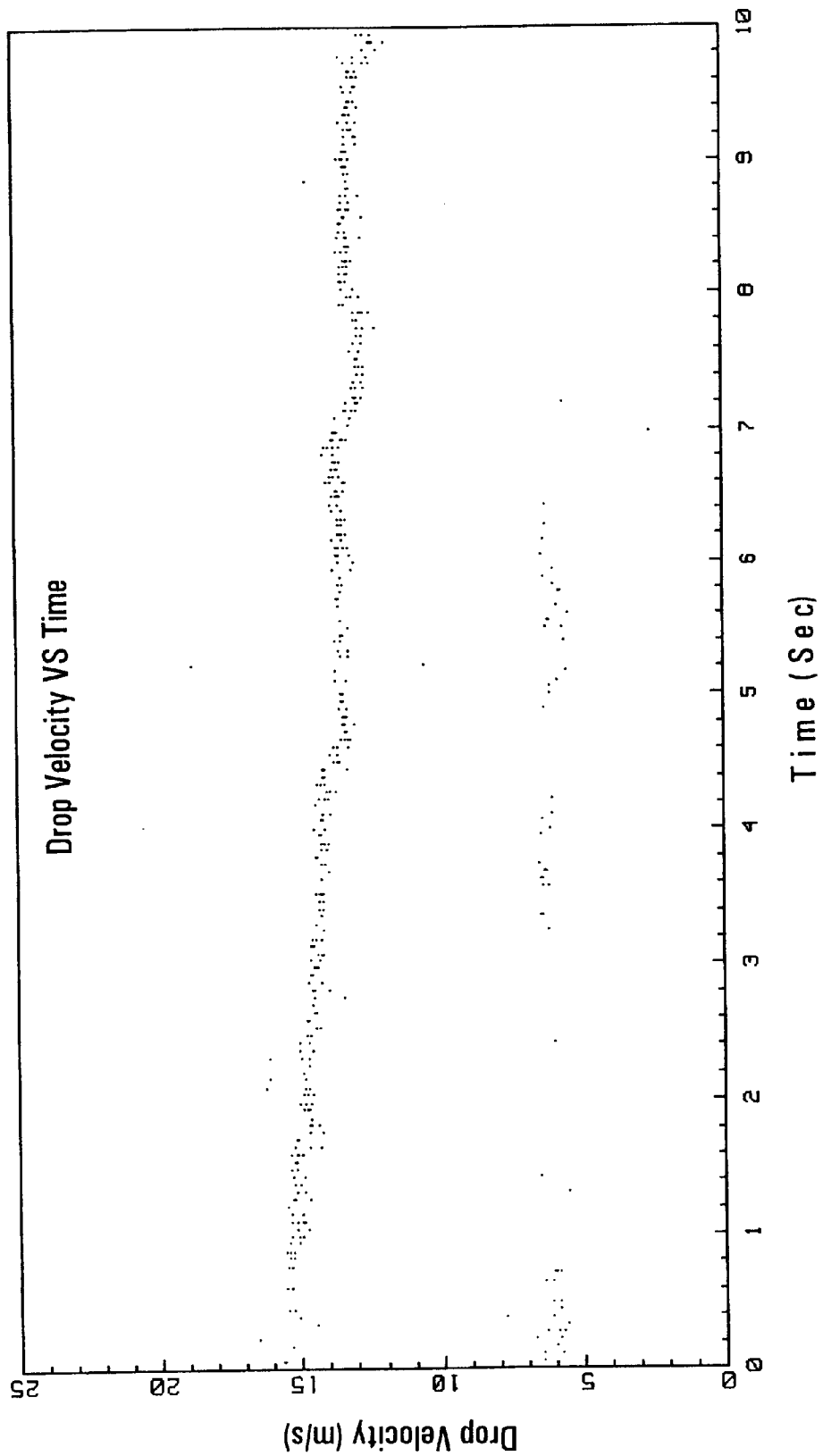
FIG. 2(c) is a plot of drop velocity versus time for a magenta ink containing $NH_4NO_3$ with an effective concentration of 0.5%, depicting an improvement in decel-alleviation.
Figure 3A:
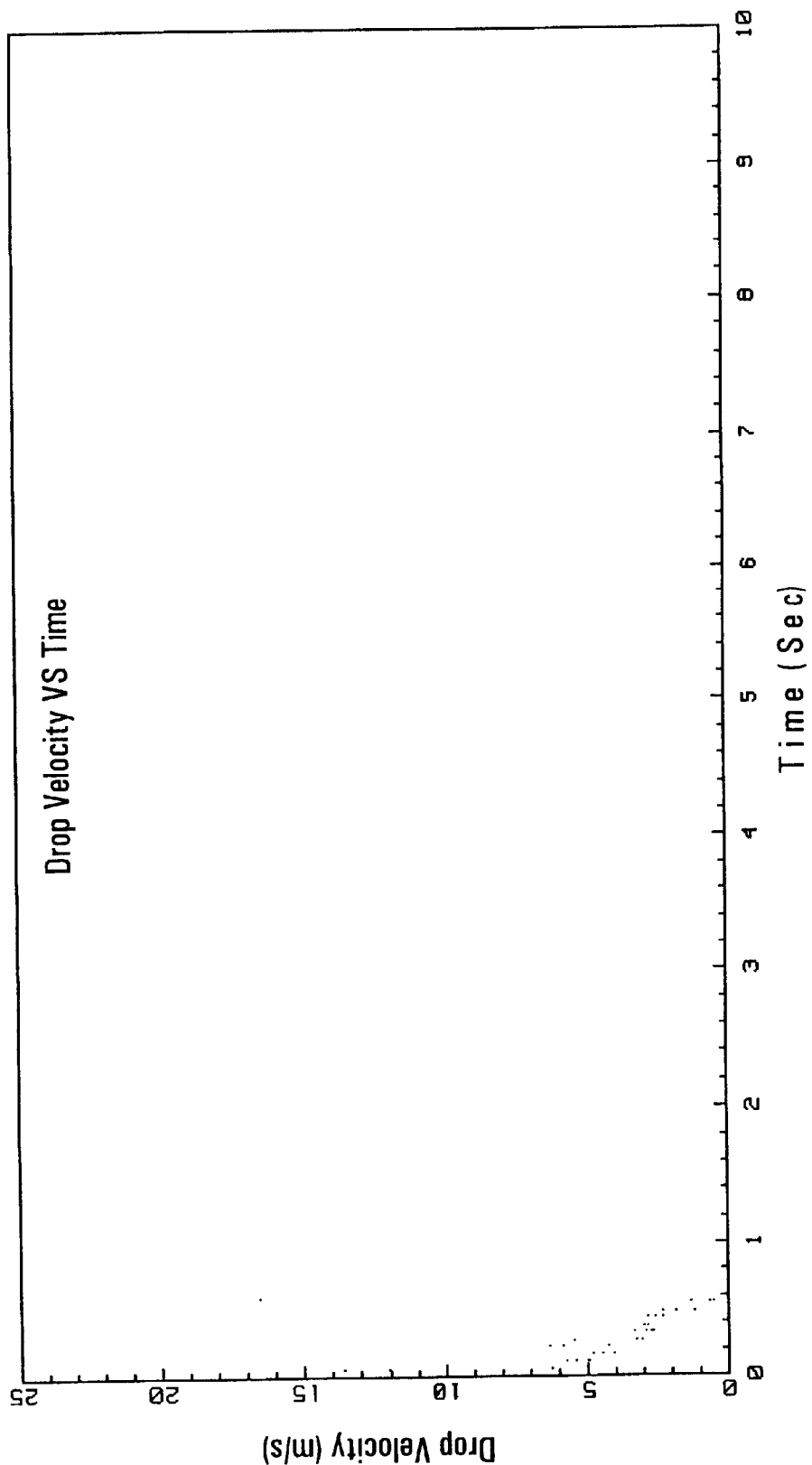
FIG. 3(a) is a plot of drop velocity versus time for a cyan ink containing no decel-alleviating component, exhibiting decel.
Figure 3B:
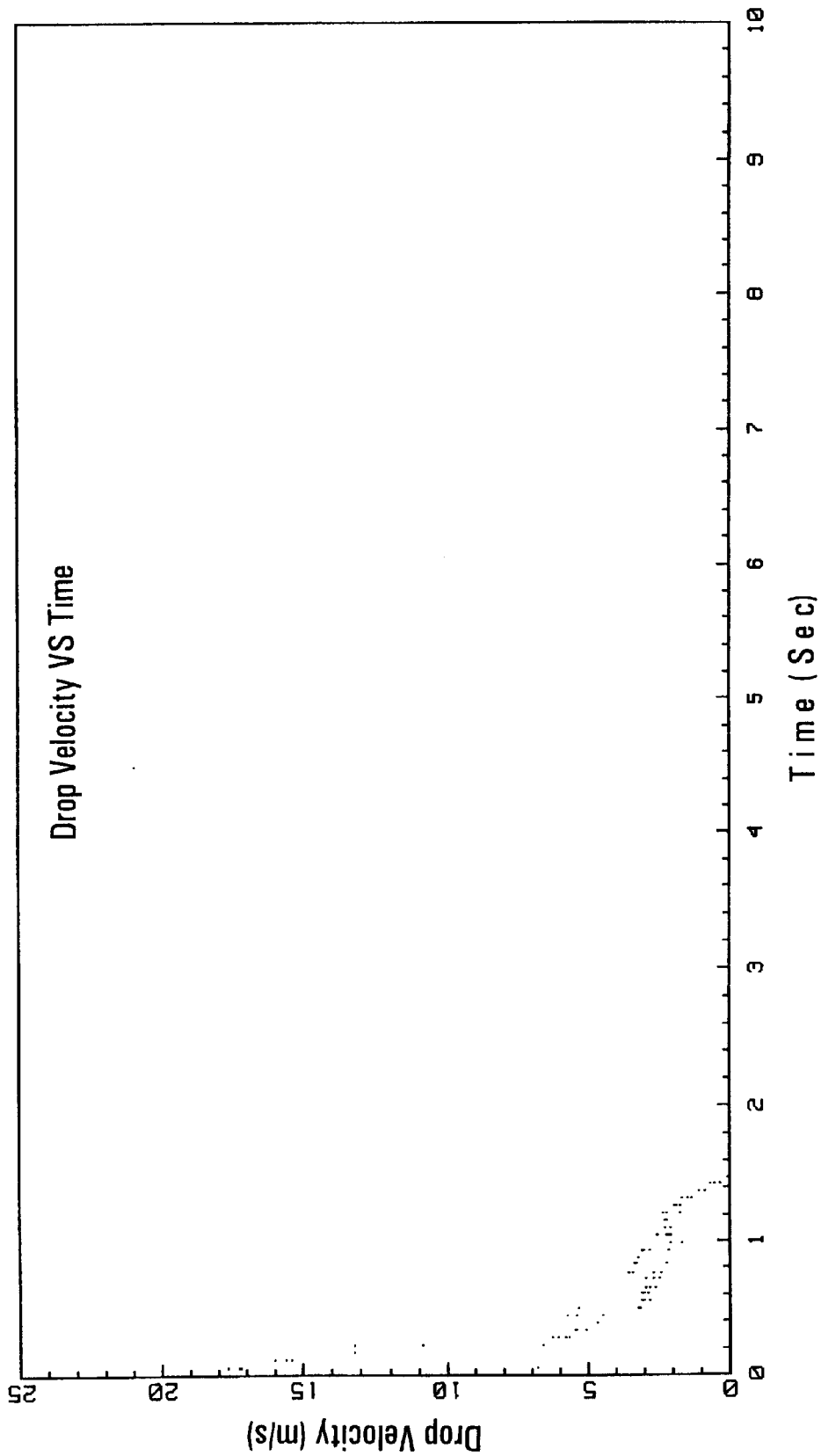
FIG. 3(b) is a plot of drop velocity versus time for a cyan ink containing $NH_4NO_3$ with an effective concentration of 0.25%, depicting an improvement in decel-alleviation.
Figure 3C:
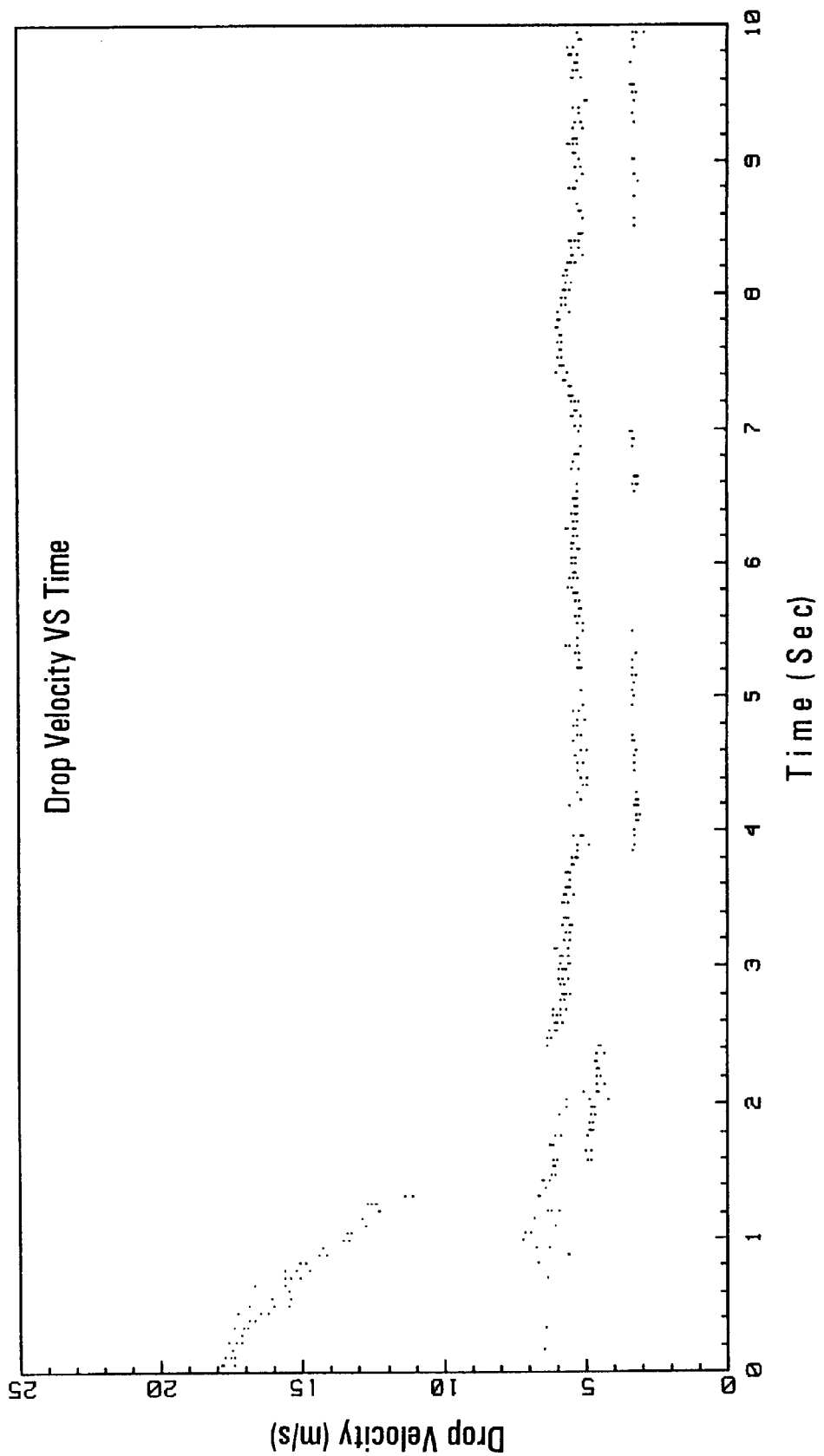
FIG. 3(c) is a plot of drop velocity versus time for a cyan ink containing $NH_4NO_3$ with an effective concentration of 0.5%, depicting an improvement in decel-alleviation.
Figure 3D:
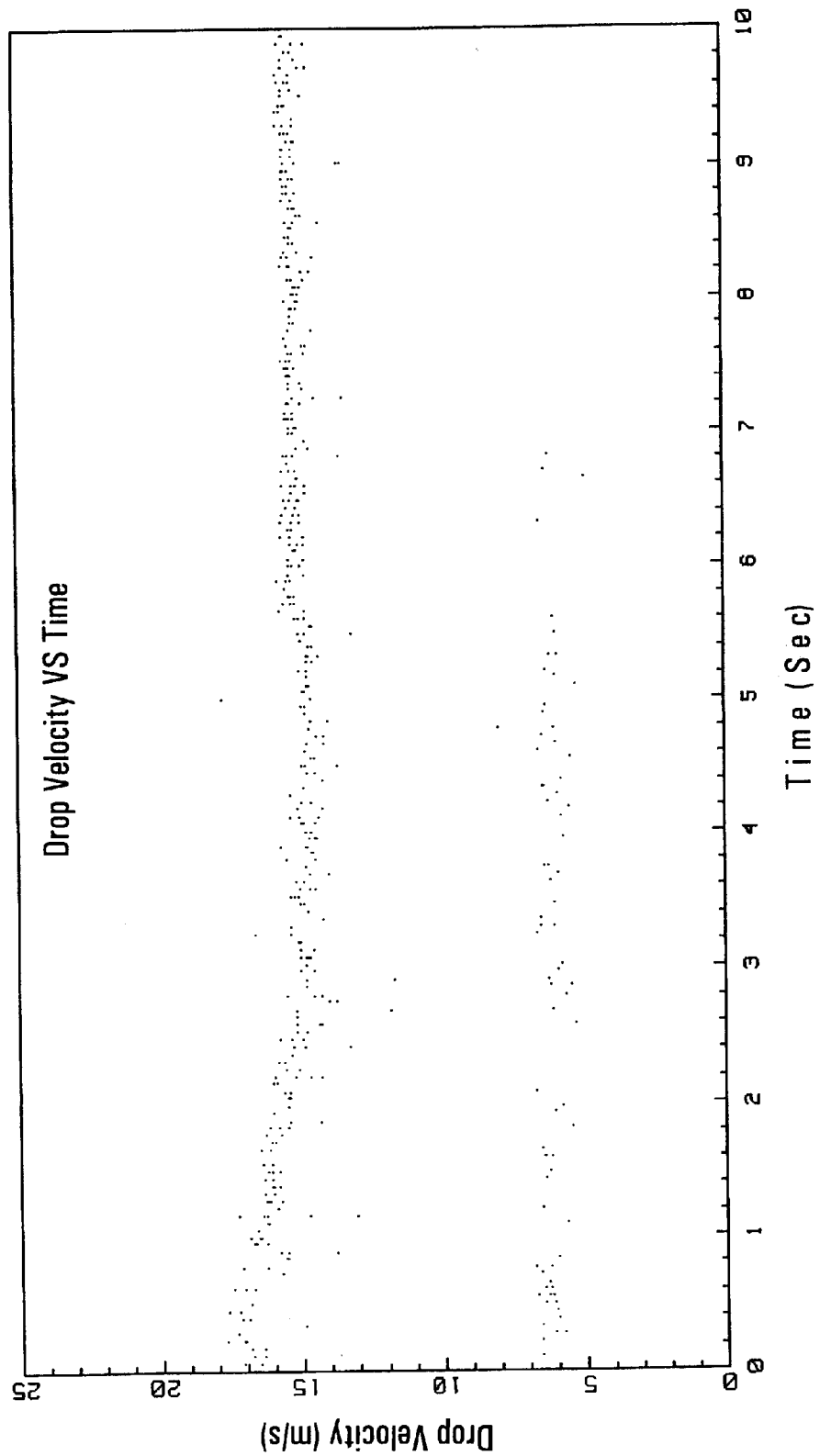
FIG. 3(d) is a plot of drop velocity versus time for a cyan ink containing $NH_4NO_3$ with an effective concentration of 1.0%, depicting an improvement in decel-alleviation.
Figure 4A:
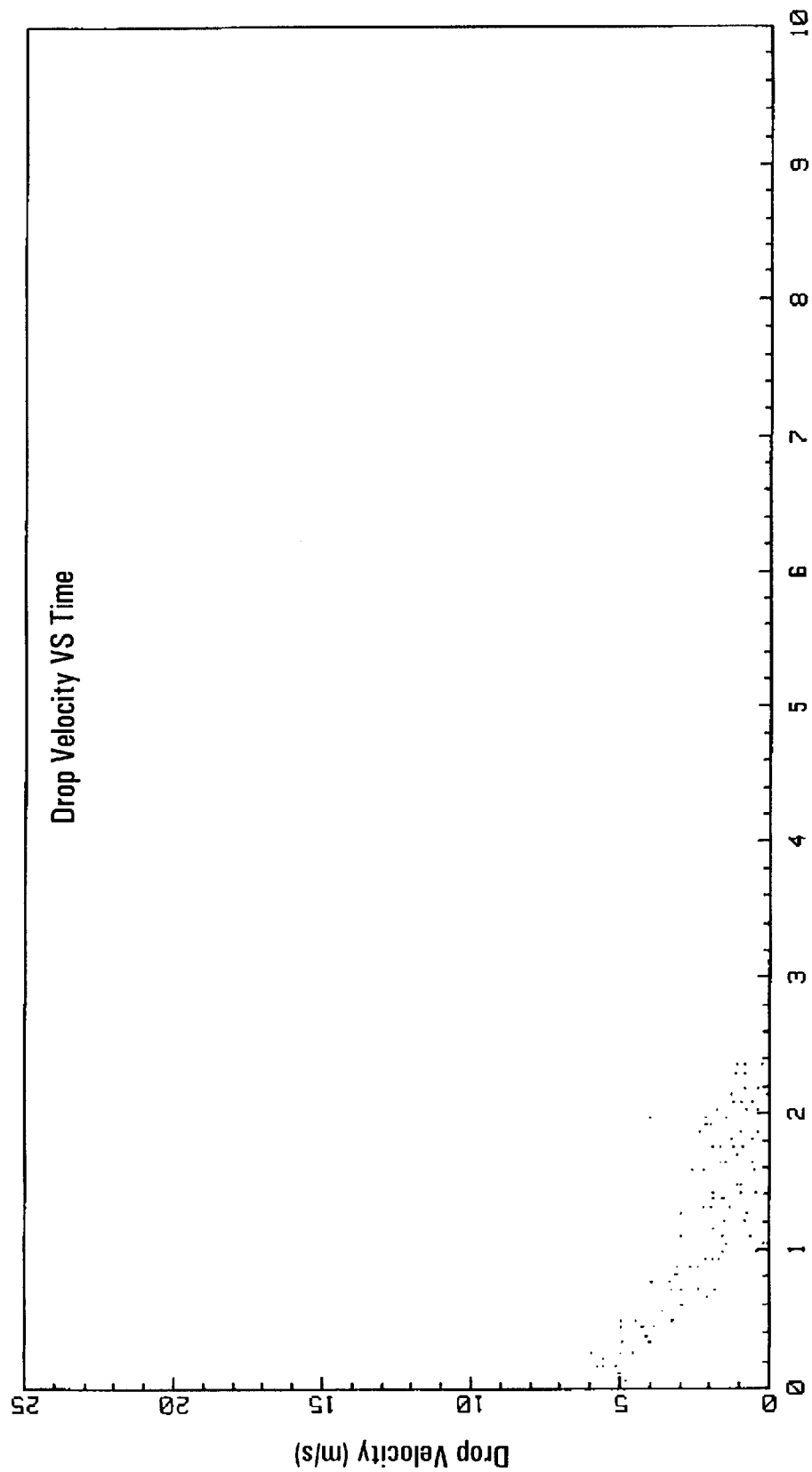
FIG. 4(a) is a plot of drop velocity versus time for a cyan ink containing no decel-alleviating component, exhibiting decel.
Figure 4B:
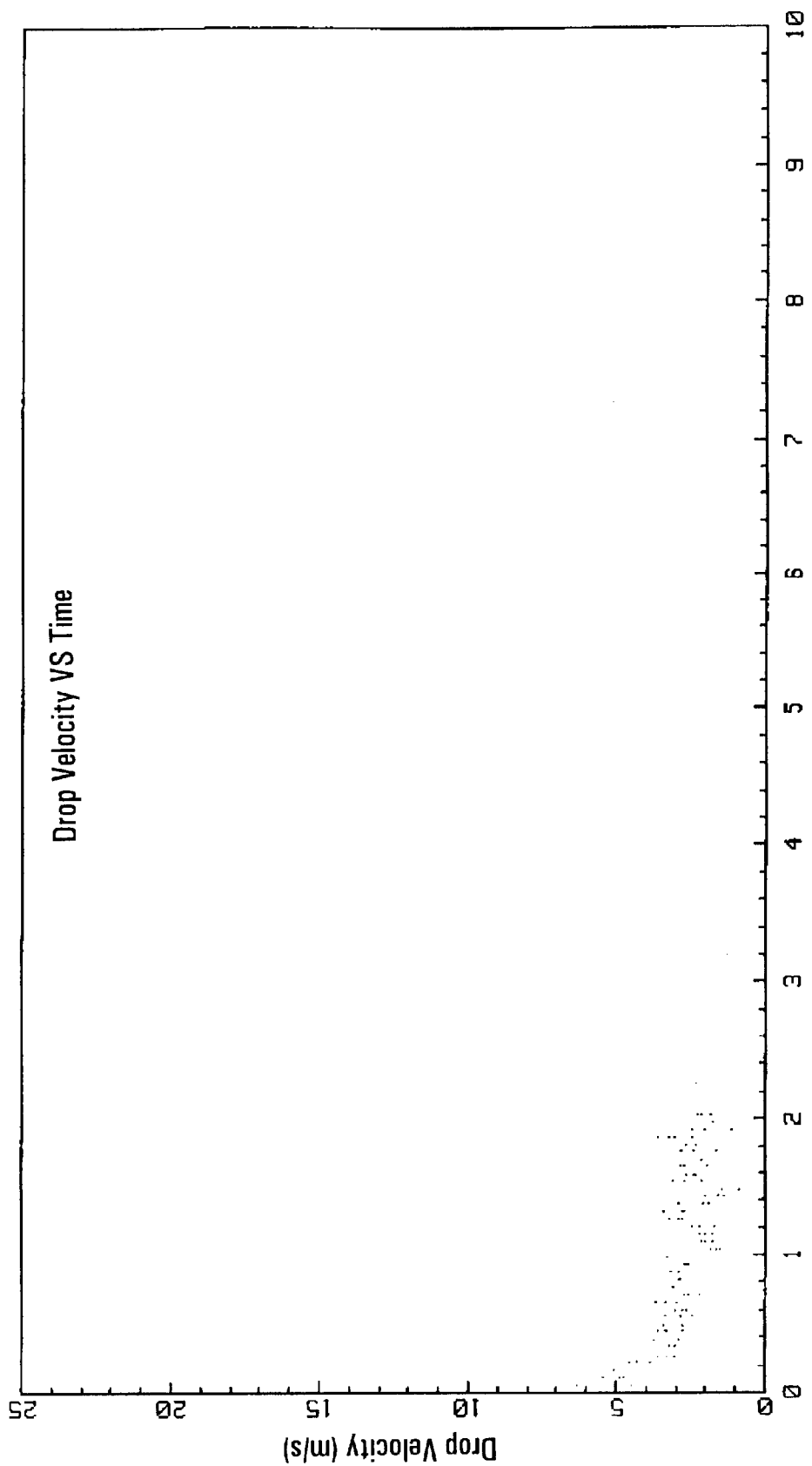
FIG. 4(b) is a plot of drop velocity versus time for a cyan ink containing no decel-alleviating component, exhibiting decel.
Figure 4C:
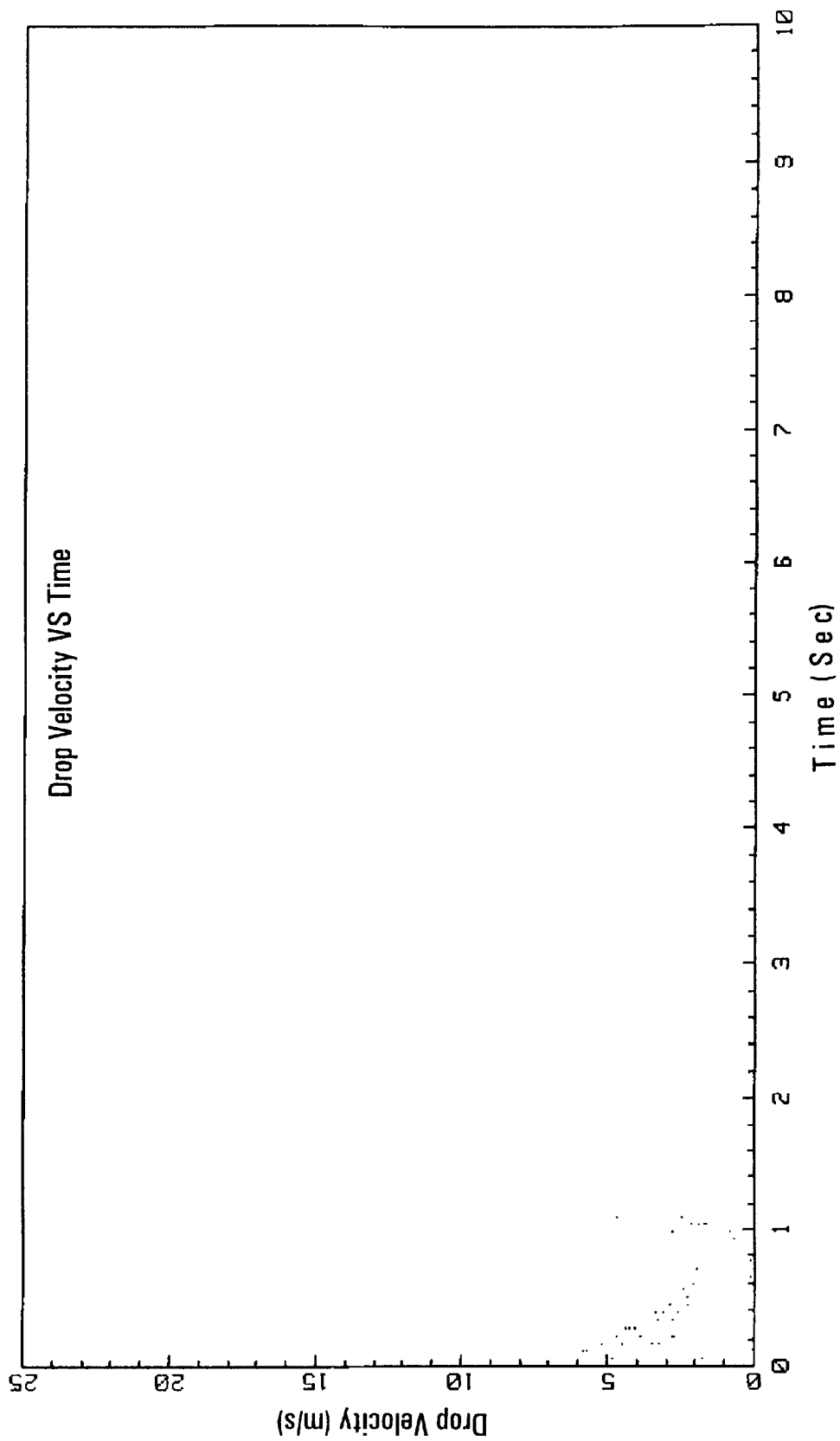
FIG. 4(c) is a plot of drop velocity versus time for a cyan ink containing no decel-alleviating component, exhibiting decel.
Figure 4D:
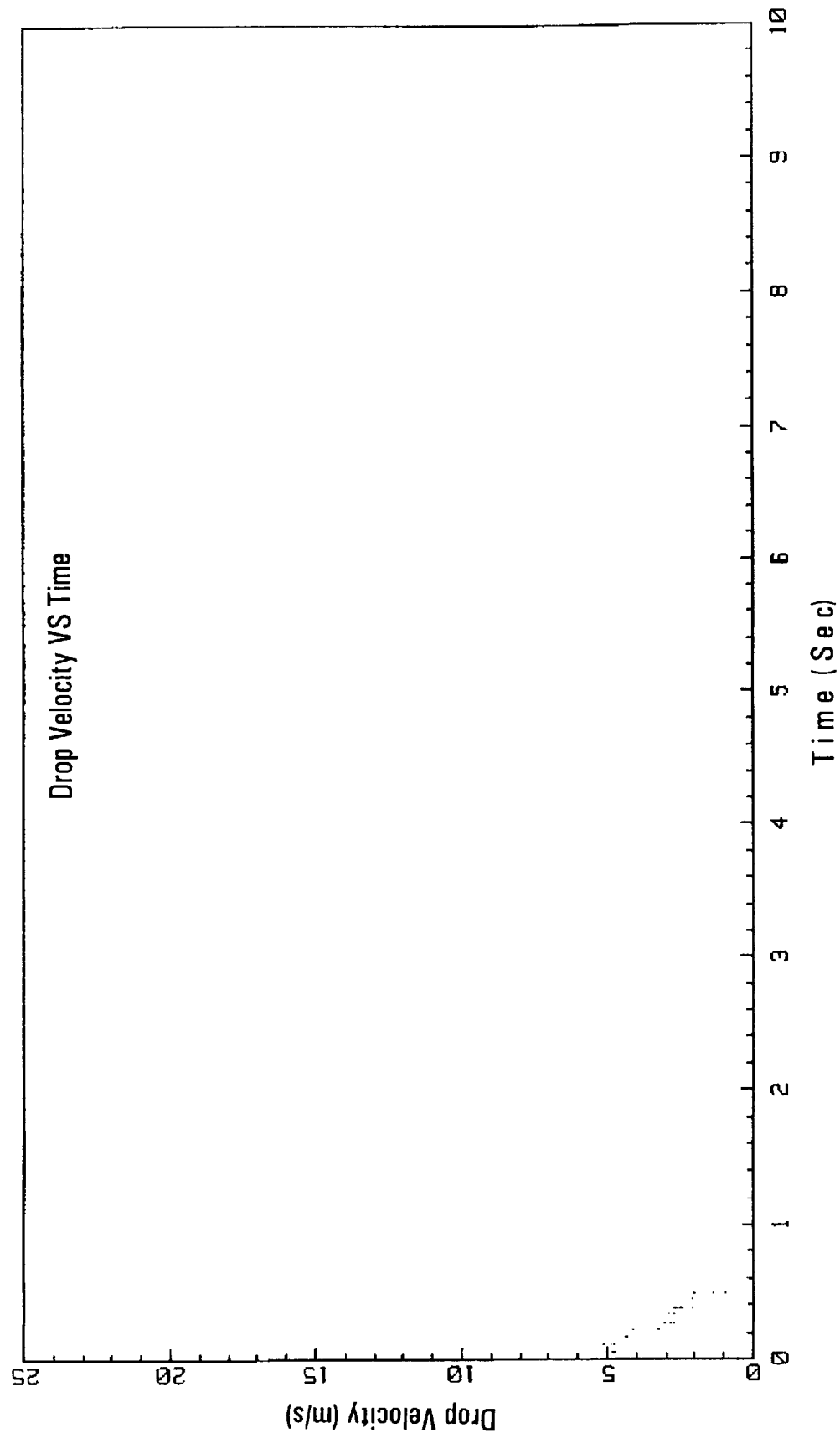
FIG. 4(d) is a plot of drop velocity versus time for a cyan ink containing no decel-alleviating component, exhibiting decel.
Figure 4E:
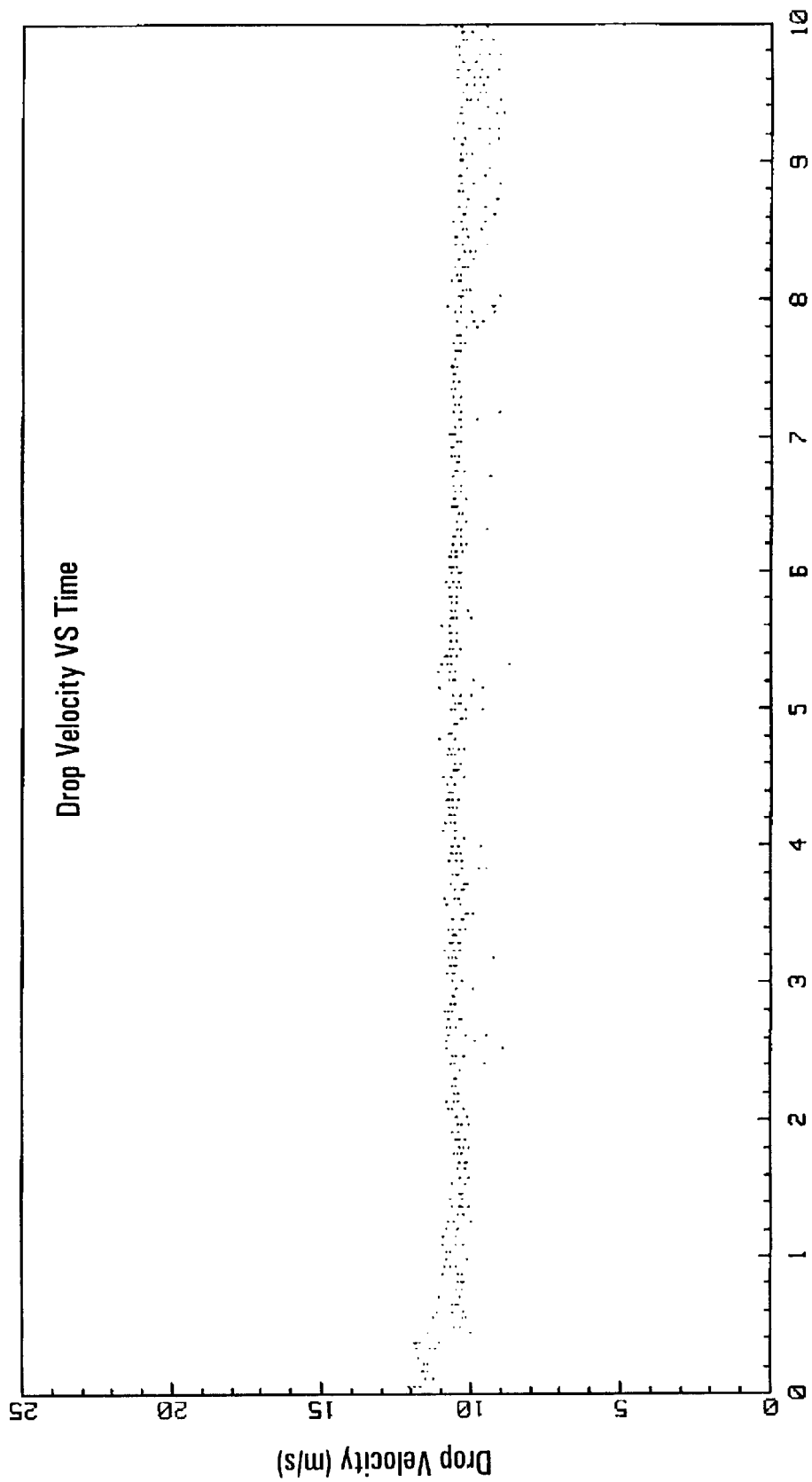
FIG. 4(e) is a plot of drop velocity versus time for a cyan ink containing $NH_4NO_3$ with an effective concentration of 1.07%, depicting an improvement in decel-alleviation.

The presence of some multi-valent metals, e.g., $Mg^{2+}$, in the first liquid, may affect drop ejection performance (e.g., "decel") of that liquid. The term "decel" refers to a rapid reduction in the drop velocity of the fired liquid drop, believed to be due to continuous firing of the thermal ink-jet resistor, and becoming more aggravated at higher drop ejection frequencies. FIGS. 1(a) through 4(e) illustrate examples of liquids exhibiting decel and inks having reduced or eliminated decel as a result of practicing the present invention. As the demand for faster throughput of ink-jet printing systems becomes greater, thus ejecting the ink-jet drops at higher frequencies, it has become more important to alleviate decel.

The present ink-jet liquids alleviate decel by formulating the first liquid to comprise a "decel-alleviating component." The decel-alleviating component comprises a liquid-soluble compound capable of undergoing rapid, preferably exothermic, thermal decomposition upon heating, preferably a salt with a cationic component and an anionic component having reducing or oxidizing capabilities (for example, $NH_4^+$ and $N_2H_5^+$ cations are more likely to be a reducer; while $NO_3^-$, $S_2O_8^{2-}$, and $NO_2^-$ anions are more likely to be an oxidizer). The decomposition products of the decel alleviating component, preferably, being a gas and/or liquid and not a solid compound.

Examples of decel-alleviating components include, but are not limited to: $NH_4NO_3$, $NH_4NO_2$, $NH_4N_3$, $N_2H_5NO_3$, $N_2H_6(NO_3)_2$, $(NH_4)_2S_2O_8$, preferably, $NH_4NO_3$.

The cationic and the anionic components of the decel-alleviating component may be present in the liquid from various independent sources. For example, in the case of ammonium nitrate, the ammonium cation may be introduced into the liquid as: the cation associated with some anionic dyes, the pH adjusting agent (e.g., $NH_4OH$ addition), the cation associated with an anionic surfactant, the cation associated with inorganic or simple organic anion added to the first ink as complementary bleed-alleviating agent (for example $NH_4Cl$, $(NH_4)_2SO_4$, $CH_3COONH_4$), or from added ammonium nitrate; while the nitrate anion may be introduced into the liquid as: the anion associated with some cationic dyes, the pH adjusting agent ($HNO_3$ addition), the anion associated with a cationic surfactant, the anion associated with a metal salt (e.g., a bleed control additive), or from added ammonium nitrate.

Without limiting the scope of the invention, the following theory is contemplated as the mechanism for the performance of the decel-alleviating additives of the present invention:

Most of the dyes used in inkjet inks are associated with $Na^+$, $Li^+$ or $TMA^+$ counter-ions. These counter-ions are, at least partially, substituted with $Mg^{2+}$ or $Ca^{2+}$ counter-ions when a salt of $Mg^{2+}$ or $Ca^{2+}$, such as $MgCl_2$ or $CaCl_2$ is added to the ink (for example in a bleed control tool).

It has been discovered that although certain metal (e.g., $Mg^{2+}$) salts of some dyes are more soluble in aqueous solutions and have higher tolerance to anionic contaminants, such as $SO_4^{2-}$, $PO_4^{3-}$, $C_2O_4^{2-}$, and $CO_3^{2-}$; than other metals (e.g., Ca) salts do; they exhibited more decel. It was also discovered that decel may be related to low thermal stability of these metal (e.g., Mg) salts formed in the ink composition and that the decomposition products of these metal (e.g., Mg) salts may act as pre-nucleation centers on the firing resistor element of the ink-jet printhead, thus causing decel.

It was further found that if the metal salt undergoes a thermal breakdown on the firing resistor during its operation (at, for examples, temperatures as high as about 300° to about 450° C.) it may result in the formation of the oxide of that metal.

When salts of certain metals, such as Mg, are used as the multi-valent metal salt, MgO accumulation on the firing resistor may, in turn, affect nucleating properties of the drive bubble. These magnesium oxide sites may trap microbubbles causing the pre-nucleation of the drive bubble. This is believed to be more problematic when using salts of metals (eg., $Mg^{2+}$ salts) having lower thermal stability than salts of other metals (e.g., $Ca^{2+}$ salts). Additionally the solubility of the oxides of certain metals, such as magnesium, in water is a few orders of magnitude lower than that of some other metals, such as calcium, yet another reason why liquids containing the former metals may exhibit more decel than liquids containing the latter metals.

It is therefore believed that the decel-alleviating component, such as ammonium nitrate, undergoes rapid exothermic decomposition at temperatures greater than 200° C. The occurrence of these micro-explosions on the firing resistor helps clean the resistor surfaces from extraneous material which can negatively impact the drive-bubble nucleation. The presence of healthy uniform drive bubble eliminates or substantially reduces decel and improves nozzle directionality.

It was also discovered that although the oxide of some metals (e.g., CaO) were not as problematic (e.g., were more soluble) as others (e,g., MgO), the presence of the decel-alleviating components of the present invention enhanced the decel performance of those liquids as well.

The decel-alleviating component is preferably, present, in sufficient effective concentration to allow for the proper cleansing of the firing resistors. Preferably, the decel-alleviating component is present in the liquid in sufficient concentration to provide an effective concentration of from about 0.05 to about 0.1 wt. % decel-alleviating component based on the initial weight of the ink, more preferably from about 0.5 to about 1.5%. Preferably, the liquid comprises sufficient concentration of: the cation that is the same as that for the decel-alleviating component in a range from about 0.01 to about 10%, preferably, from about 0.02 to about 3%, and most preferably, from about 0.1 to about 1%; the anion that is the same as that for the decel-alleviating component in a range from about 0.03 to about 20%, preferably, from about 0.06 to about 10%, and most preferably, from about 0.2 to 6%.

It should be noted that the individual ionic components (i.e., cationic and anionic) of the decel-alleviating component may be present in the liquid regardless of their initial respective sources. The concentration of the decel-alleviating component may be roughly calculated, using a simplified equation I, as described below. It should be noted that Equation I is a simplified way for estimating, as a first attempt, the amount of decel-alleviating component, and that it does not include all terms relating to all ions potentially present in a liquid:

Equation I

% effective DAC=(M.W. DAC)*[(molar content of cationic component of DAC per 100 g of ink)*(molar content of anionic component of DAC per 100 g of ink)]/[sum of the molar content of all anions per 100 g of ink]

wherein:

DAC=decel-alleviating component

M.W.=molecular weight

As can be noted from Equation I, the efficiency of $NH_4NO_3$ added to the liquid is dependent on the presence, if any, of other ionic species in the liquid. For example, adding 1 wt % of $NH_4NO_3$ to a liquid containing nitrates from other sources (such as $Mg(NO_3)_2*6H_2O$) would be more efficient than adding the same amount of $NH_4NO_3$ to a liquid containing few % wt. of material not containing nitrates (such as magnesium acetate).

Preferably, in the liquid, the ratio of the total cations which are the same as the cationic component of the decel-alleviating component to the total anions which are same as the anionic component of the decel-alleviating component is about 1 to about 4. For example, in the case of $NH_4NO_3$ as the decel-alleviating component, the preferred ratio for total $NH_4^+$ to total $NO_3^-$, regardless of the source of the ions, is about 1 to about 4.

First Colorant

The first liquid may be an ink or a clear liquid. When the first liquid is used as an ink, it furthermore, contains at least one colorant.

The colorant of the first ink must be carefully selected for a variety of reasons. First, the colorant should be of a type which is preferably lighter in color than the colorant used in the second ink composition. If a black colorant is used in the second ink composition, then almost any other color may be appropriately selected for the colorant in the first ink. Next, the colorant in the first ink must be of a type which will not react with the precipitating agent when these two materials are formulated in the same ink. More specifically, the colorant in the first ink must be of a type which remains soluble when formulated with the precipitating agent. This normally results when a colorant is used which does not gain its solubility mainly from carboxyl and/or carboxylate groups, and remains soluble in solutions of moderate to high ionic strength. The colorant may be a dye, a pigment, the pigment being self-stabilized or dispersed with the aid of a dispersing agent; the colorant preferably being a dye.

In this regard, exemplary and preferred dyes suitable for use in the first ink shall include but are not limited to the following materials presented below in Table III:

TABLE III

| Color Index Number | Name |
|---|---|
| 42090 | Acid Blue 9 |
| 45100 | Acid Red 52 |
| 19140 | Acid Yellow 23 |
| 45110 | Acid Red 289 |
| Not available | Direct Blue 199 |
| Not available | Direct Blue 189 |
|  | Reactive Red 180 |
|  | AR52 |
|  | M377* |

M377*, available from Ilford AG, Rue de l'Industrie, CH-1700 Fribourg, Switzerland.

Many of these materials are listed in the Color Index, supra, on pages 4132, 4385, and 4419 which are incorporated herein by reference. Furthermore, in accordance with the definition of "colorant" set forth herein, various pigment dispersion materials may also be used in the first ink. Such pigment dispersion materials shall be of a type which will not react with the foregoing precipitating agents. For example, suitable compositions for this purpose would include nonionic pigment dispersions, lignosulfonate dispersions, and/or amine dispersions known in the art which, as determined by preliminary pilot studies, would not react with the precipitating agents described herein.

The colorant, when present in the ink as a dye, a pigment, or a combination of both, may be present from about 0.05 to about 20%, by weight, preferably, from about 0.1 to about 8%, by weight, and more preferably, from about 0.5 to about 5%, by weight, based on the total weight of the ink.

Second Ink

Second Colorant

The second ink comprises at least one second colorant having a functional group hat upon contact, for example on the print medium, with the first liquid, can associate to form an insoluble salt, complex, or compound; with the metal in the first liquid, thereby immobilizing the second colorant in the second ink. The second colorant preferably has at least one and preferably two or more carboxyl and/or carboxylate groups. Exemplary carboxylated dye materials suitable for use in the present invention are listed in U.S. Pat. No. 4,963,189 to Hindagolla which is incorporated herein by reference. Such materials are black and involve the following basic structure:

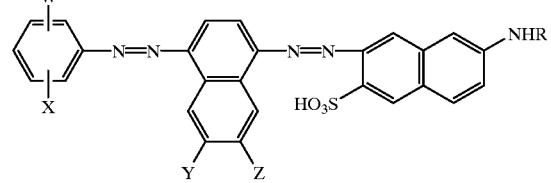

wherein
W is COOH,
X is H, or COOH,
Y is H, COOH, or $SO_3H$,
Z is H, COOH, or $SO_3H$, and
R is H, $CH_2COOH$, or $CH_2CH_2COOH$.

In this structure, it is preferred that there be at least two —COOH groups as indicated above, and that the number of —COOH groups be equal to or greater than the number of —$SO_3H$ groups. Specific and exemplary dye structures are provided in Table IV below:

TABLE IV

| Dye # | X | W | Y | Z | R |
|---|---|---|---|---|---|
| 1 | 3-COOH | 5-COOH | H | H | H |
| 2 | 3-COOH | 5-COOH | COOH | H | H |
| 3 | 3-COOH | 5-COOH | H | COOH | H |
| 4 | 3-COOH | 5-COOH | H | $SO_3H$ | H |
| 5 | 3-COOH | 5-COOH | $SO_3H$ | H | H |
| 6 | H | 4-COOH | H | COOH | H |
| 7 | 3-COOH | 4-COOH | H | H | $CH_2COOH$ |
| 8 | 2-COOH | 5-COOH | H | $SO_3H$ | $CH_2COOH$ |
| 9 | 3-COOH | 5-COOH | $SO_3H$ | H | $CH_2COOH$ |
| 10 | 3-COOH | 5-COOH | H | H | $CH_2CH_2COOH$ |
| 11 | 3-COOH | 5-COOH | H | COOH | $CH_2COOH$ |

Additional carboxylated dye materials suitable for use in the present invention are described in the Color Index, Vol. 4, 3rd ed., published by The Society of Dyers and Colourists, Yorkshire, England (1971), which is incorporated herein by reference and is a standard reference that is well known in the art. Exemplary carboxylated dye materials listed in the Color Index which are suitable for use herein are listed below in Table V:

TABLE V

| Color Index Number | Name |
|---|---|
| 14045 | Mordant Yellow 12 |
| 14055 | Mordant Yellow 14 |
| 23640 | Direct Yellow 2 |
| 23645 | Triazol Red 10B (By) |
| 23660 | Direct Yellow 48 |
| 36040 | Dianil Fast Brown B (MLB) |
| 36210 | Oxydiamine Brown RN (C) |
| 36220 | Columbia Catechine O (A) |
| 43550 | Mordant Violet 11 |
| 43555 | Mordant Violet 10 |

TABLE V-continued

| Color Index Number | Name |
| --- | --- |
| 43560 | Mordant Violet 15 |
| 43565 | Mordant Violet 1 |
| 43570 | Mordant Violet 28 |
| 43810 | Mordant Violet 39 |
| 43820 | Mordant Blue 3 |
| 43825 | Mordant Blue 29 |
| 43830 | Mordant Blue 1 |
| 43835 | Mordant Blue 55 |
| 43840 | Chromoxane Green GG (By) |
| 43845 | Mordant Green 21 |
| 43850 | Chromoxane Brl't Blue GM |
| 43855 | Mordant Blue 47 |
| 43860 | Mordant Violet 27 |
| 43865 | Mordant Violet 16 |
| 43866 | Mordant Violet 17 |
| 43870 | Mordant Violet 33 |

Further information regarding the foregoing compositions is provided on pages 4059, 4193, 4194, 4340, and 4406–4410 of the Color Index, supra, with such pages being incorporated herein by reference. In a preferred embodiment, the second ink comprises a colorant concentration ranging from about 0.5% up to the solubility limit of the colorant in the ink composition. The solubility level of the colorant will necessarily vary, depending on the specific colorant being used and other ingredients in the ink composition. In a preferred embodiment, the second ink will comprise from about 2 to about 7% colorant.

When the colorant is a pigment, the colorant may be a carboxylated pigment dispersion materials basically comprising a water insoluble colorant (e.g. a pigment) which is rendered soluble through association with a dispersant having the appropriate ionic group (e.g., caroboxylated, sulfonated), preferably, a carboxylate solubilizing groups (e.g. an acrylic dispersant). Alternatively, a pigment may be self-stabilized through the presence of functional groups on the pigment surface without the aid of any dispersants. Colorants in combination with the dispersants which are used to produce the foregoing pigment dispersions normally comprise of inorganic and organic dye compositions (e.g. pigments) known in the art. Examples of such pigments include but are not limited to the following compositions which are listed in the Color Index, supra: Pigment Black 7 (C.I. #77266), Pigment Blue 15 (C.I. #74160), Pigment Red 2 (C.I. #12310), and Disperse Red 17 (C.I. #11210). All of these materials are listed on pages 4018, 4035, 4618, and 4661 of the Color Index, supra, which are again incorporated herein by reference. As noted above, the foregoing pigments are combined with dispersants having at least one and preferably multiple carboxyl groups which basically consist of acrylic monomers and polymers known in the art. An exemplary dispersant includes a product sold by W. R. Grace and Co. of Lexington Mass., USA under the trademark DAXAD 30-30. Or, alternatively, the pigment, may be self-dispersed, as those provided under the Trade name Cabojet, by Cabot Company. Other chemically comparable materials may be used which are determined by reasonable investigation to be suitable for the purposes set forth herein.

The colorant is present in the second ink ranges from about 0.05 to about 20%, preferably, from about 0.1 to about 8%, and more preferably, from about 0.5 to about 5%.

It should also be noted that the second ink is may be adjusted to an appropriate pH, preferably above 3, more preferably above 5, and most preferably adjusted to a pH of about 8 to about 9, through the addition of pH adjusting compounds such as $NH_4OH$. Under certain circumstances, it may be desirable and necessary to increase the pH of second ink in order to ensure that the colorant remains in solution. This is typically accomplished through pilot tests with second ink wherein a direct observation of the completed ink composition will indicate whether precipitation of the colorant has occurred. To control/prevent this situation from taking place, a base (e.g. $NH_4OH$) is preferably added to the ink composition in order to place the colorant back into solution. The amount of base suitable for this purpose and the resulting pH of the composition is then noted and used in subsequent formulations. In general, the use of a pH adjusting agent (if necessary) will depend on the type of colorant being used. Also, the amount of pH adjusting agent and the type thereof is readily determinable using pilot tests in conjunction with the exercise of routine chemical procedures which are well known in the art.

Additional Components

Consistent with the requirements for this invention, various types of additives may be employed in the liquids to optimize the properties of the liquid composition for specific applications. For example, as is well known to those skilled in the art, one or more biocides, fungicides, and/or slimicides (microbial agents) may be used in the liquid composition as is commonly practiced in the art. Examples of suitably employed microbial agents include, but are not limited to, NUOSEPT (Nudex, Inc.), UCARCIDE (Union Carbide), VANCIDE (RT Vanderbilt Co.), and PROXEI (ICI America). Anionic, non-ionic, or amphoteric surfactants may also be used. A detailed list of non-polymeric surfactants as well as some polymeric surfactants are listed at pages 110–129, of 1990 McCutcheon's Functional Materials, North American Edition, Manufacturing Confection Publishing Co., Glen Rock, N.J. The choice of a specific surfactant is highly dependent on the particular liquid composition and type of media substrate to be printed on. Cosolvents may be included to improve penetration of liquid into the printing substrate and/or the performance of the ink-jet printing mechanism (e.g., drop generator). Such cosolvents are well known in the art. Representative cosolvents that can be used are exemplified in U.S. Pat. No. 5,272,201. Other known additives such as viscosity modifiers and other acrylic or non-acrylic polymers may be added to improve various properties of the liquid compositions as desired.

EXAMPLES

Inks

To demonstrate the effectiveness of the present invention, inks were made comprising the compositions listed in Table VI, below:

TABLE VI

| Liquid#/Figure | [1]Colorant | % Precipitating Agent | [2]% Added Alleviating Component "Candidate" | [3]% wt. Effective Decel-Alleviating Component & Its Corresponding Ions |
|---|---|---|---|---|
| 1(a) | AY17 + Y104 | 6% Mg(NO$_3$)$_2$*6H$_2$O | 0.0% NH$_4$NO$_3$ | NH$_4$NO$_3$ 0%<br>NH$_4^+$ 0.0%<br>NO$_3^-$ 2.9% |
| 1(b) | AY17 + Y104 | 6% Mg(NO$_3$)$_2$*6H$_2$O | 0.25% NH$_4$NO$_3$ | NH$_4$NO$_3$ 0.25%<br>NH$_4^+$ 0.06%<br>NO$_3^-$ 3.1% |
| 1(c) | AY17 + Y104 | 6% Mg(NO$_3$)$_2$*6H$_2$O | 0.5% NH$_4$NO$_3$ | NH$_4$NO$_3$ 0.5%<br>NH$_4^+$ 0.12%<br>NO$_3^-$ 3.28% |
| 2(a) | AR52 + M377 | 6% Mg(NO$_3$)$_2$*6H$_2$O | 0% NH$_4$NO$_3$ | NH$_4$NO$_3$ 0%<br>NH$_4^+$ 0.0%<br>NO$_3$ 2.9% |
| 2(b) | AR52 + M377 | 6% Mg(NO$_3$)$_2$*6H$_2$O | 0.1% NH$_4$NO$_3$ | NH$_4$NO$_3$ 0.1%<br>NH$_4^+$ 0.023%<br>NO$_3^-$ 2.98% |
| 2(c) | AR52 + M377 | 6% Mg(NO$_3$)$_2$*6H$_2$O | 0.5% NH$_4$NO$_3$ | NH$_4$NO$_3$ 0.5%<br>NH$_4^+$ 0.12%<br>NO$_3^-$ 3.28% |
| 3(a) | AB9 + DB199 | 6% Mg(NO$_3$)$_2$*6H$_2$O | 0% NH$_4$NO$_3$ | NH$_4$NO$_3$ 0%<br>NH$_4^+$ 0.0%<br>NO$_3^-$ 2.9% |
| 3(b) | AB9 + DB199 | 6% Mg(NO$_3$)$_2$ | 0.25% NH$_4$NO$_3$ | NH$_4$NO$_3$ 0.25%<br>NH$_4^+$ 0.06%<br>NO$_3^-$ 3.1% |
| 3(c) | AB9 + DB199 | 6% Mg(NO$_3$)$_2$*6H$_2$O | 0.5% NH$_4$NO$_3$ | NH$_4$NO$_3$ 0.5%<br>NH$_4^+$ 0.12%<br>NO$_3^-$ 3.28% |
| 3(d) | AB9 + DB199 | 6% Mg(NO$_3$)$_2$*6H$_2$O | 1.0% NH$_4$NO$_3$ | NH$_4$NO$_3^-$ 1.0%<br>NH$_4^+$ 0.23%<br>NO$_3^-$ 3.7% |
| 4(a) | AB9 + DB 199 | 6% Mg(CH$_3$COO)$_2$ | | NH$_4$NO$_3$ 0%<br>NH$_4^+$ 0%<br>NO$_3^-$ 0% |
| 4(b) | AB9 + DB199 | 6% Mg(CH$_3$COO)$_2$ | 1% NH$_4$(CH$_3$COO) | NH$_4$NO$_3$ 0%<br>NH$_4^+$ 0.234%<br>NO$_3^-$ 0% |
| 4(c) | AB9 + DB199 | 6% Mg(CH$_3$COO)$_2$ | 1% NaCLO$_4$ | NH$_4$NO$_3$ 0%<br>NH$_4^+$ 0%<br>NO$_3^-$ 0% |
| 4(d) | AB9 + DB199 | 6% Mg(NO$_3$)$_2$*6H$_2$O | 1% TMA(NO$_3$) | NH$_4$NO$_3$ 0%<br>NH$_4^+$ 0%<br>NO$_3^-$ 3.4% |
| 4(e) | AB9 + DB199 | 6% Mg(NO$_3$)$_2$*6H$_2$O | 1% NH$_4$Cl | NH$_4$NO$_3$ 1.07<br>NH$_4^+$ 0.336%<br>NO$_3^-$ 2.9% |

[1]AB-9 = Acid Blue 9
AR-52 = Acid Red 52
DB199 = Direct Blue 199
AY17 = Acid Yellow 17
Y104 = Yellow 104 available from Ilford AG, Rue de l'Industrie, CH-1700 Fribourg, Switzerland; patent number US 5721344 and EP 0755984 A1 M377 = available from Ilford AG, Rue de l'Industrie, CH-1700 Fribourg, Switzerland.
[2]Material added to the liquid as a decel-alleviating component candidate.
[3]In the examples of Table VI, the decel-alleviating component of interest was NH$_4$NO$_3$, thus the corresponding NH$_4^+$ and NO$_3^-$ ions. When any one of the two ions associated with decel-alleviating component is not present, there will be no decel-alleviating component in the liquid.

Liquid 4(e) will now be used to further illustrate the calculation of the effective concentration of the decel-alleviating component, per the simplified Equation I, above. As can be noted, this assumes that there are no other anions of interest in the liquid:

% effective DAC=(M.W. DAC)*[(molar content of cationic component of DAC per 100 g of ink)*(molar content of anionic component of DAC per 100 g of ink)]/[sum of the molar content of all anions per 100 g of ink]

wherein:

DAC=decel-alleviating component=NH$_4$NO$_3$
M.W.=molecular weight
1. M.W. Mg(NO$_3$)$_2$*6H$_2$O=256.4.
   M.W. NH$_4$Cl=53.5.
2. Molar content of Mg(NO$_3$)$_2$*6H$_2$O in 100 g of the ink=6/256.4=0.0234M
   Molar content of NH$_4$Cl in 100 g of the ink=1/53.5=0.0187M
3. Molar content of NH$_4^+$ cation in solution=0.0187M (same as NH$_4$Cl).

4. Molar content of Cl⁻ anion in the solution=0.0187M (same as $NH_4Cl$).
5. Molar content of $NO_3^-$ anion in the solution= 0.0234M*2=0.0468M (molar content of $Mg(NO_3)_2$*6H$_2$O*2).
6. Assuming $NH_4^+$ cations are distributed between $NO_3^-$ and Cl⁻ anions in the solutions according to molar fractions of the $NO_3^-$ and Cl⁻ anions; the molar content of the resulting $NH_4NO_3$ in the solution will be equal molar content of $NH_4^+$ cation multiplied by molar fraction of $NO_3^-$ anion in the solution.
7. Molar fraction of $NO_3^-$ anion in the solution is equal $[NO_3^-]/([NO_3^-]+[Cl^-])$.
8. Thus molar content of resulting $NH_4NO_3$ in the solution is equal:

$$[NH_4^+]*[NO_3^-]/([NO_3^-]+[Cl^-])=0.0187M*0.0468M/(0.0468M+0.0187M)=0.0134M.$$

9. Molecular weight of $NH_4NO_3$ is equal to 80.
10. Resulting weight content of $NH_4NO_3$ in the ink is 80*0.0134=1.0686 g per 100 g of the ink or 1.07% wt.

Calculations for the effective concentration of decel-alleviating component per Equation 1, for Sample 1(c):
1. Ink weight=100 gram
2. $[Mg(NO_3)_2*6H_2O]=0.0234M$
   $[NH_4NO_3]=0.0063M$
   $[NH_4^+]=0.0063M$
3. Total $[NO_3^-]=0.0063+0.0234*2=0.05305M$
4. Total anions (w/o anionic dyes)=Total$[NO_3^-]=0.05305M$
5. Resulting $[NH_4NO_3]=[NH_4^+]$*Total $[NO_3^-]/[$total anions$]=0.0063*0.05305/0.05305=0.0063$
6. % wt. of $NH_4NO_3=80*0.0063=0.5\%$ Decel Performance This test measured the effect of time on drop velocity. The term "decel" refers to a rapid reduction in the drop velocity of the fired liquid drop, believed to be due to continuous firing of the thermal ink-jet nozzle, and becoming more aggravated at higher drop ejection frequencies. The formulated inks were filled into ink-jet print cartridges, available from Hewlett-Packard Co., of Wilmington, Del. All ink-filled pens were tested to ensure that all nozzles were in working condition. The pens were then fired at a constant, yet high drop firing frequencies of 12 kHz or higher, and the ejected drop velocity was measured as a function of time, and the data is represented in FIGS. 1(a) through 4(e). As can be noted from the data in the figures, inks containing the decel-alleviating components of the present invention, demonstrated a significant improvement in drop velocity performance. It should be appreciated, that although the decel-alleviating components of the present invention were evaluated in "inks" and not clear liquids, the invention, as described above, is equally applicable to clear liquids.

Thus, it has been demonstrated that liquids and liquid sets formulated according to the present invention and methods for using the same, will enable the production of high quality prints while maintaining high ink-jet drop ejection performance, particularly, alleviation of decel.

What is claimed is:

1. An ink-jet liquid comprising:
   an aqueous vehicle;
   a precipitating agent which comprises $Mg^{+2}$ cation; and
   a decel-alleviating component, wherein the decel-alleviating component is a liquid-soluble compound having a cationic component and an anionic component, the decel-alleviating component being capable of undergoing rapid thermal decomposition upon heating.

2. The liquid of claim 1 wherein the thermal decomposition is exothermic.

3. The liquid of claim 1 wherein the decel-alleviating component is a salt having a cationic component and an anionic component having reducing or oxidizing capabilities.

4. The liquid of claim 1 wherein the decomposition product of the decel-alleviating component is a gas or a liquid.

5. The liquid of claim 1 wherein the decel-alleviating component comprises a compound selected from the group consisting of $NH_4NO_3$, $NH_4NO_2$, $NH_4N_3$, $N_2H_5NO_3$, $N_2H_6(NO_3)_2$, $(NH_4)_2S_2O_8$.

6. The liquid of claim 1 wherein the decel-alleviating component is $NH_4NO_3$.

7. The liquid of claim 1, 5, or 6 wherein the total concentration of the cation that is the same as that associated with the decel-alleviating component is in a range from about 0.01 to about 10%.

8. The liquid of claim 7 wherein the the total concentration of the cation that is the same as that associated with the decel-alleviating component is in a range from about 0.02 to about 3%.

9. The liquid of claim 7 wherein the the total concentration of the cation that is the same as that associated with the decel-alleviating component is in a range from about 0.1 to about 1%.

10. The liquid of claim 1, 5, or 6 wherein the total concentration of the anion that is the same as that associated with the decel-alleviating component is in a range from about 0.03 to about 20%.

11. The liquid of claim 10 wherein the total concentration of the anion that is the same as that associated with the decel-alleviating component is in a range from about 0.06 to about 10%.

12. The liquid of claim 10 wherein the total concentration of the anion that is the same as that associated with the decel-alleviating component is in a range from about 0.2 to about 6%.

13. The liquid of claim 1, 5, or 6 wherein the ratio of the total cations which are the same as the cationic component of the decel-alleviating component to the total anions which are same as the anionic component of the decel-alleviating component is about 1 to about 4.

14. The liquid of claim 1 wherein the precipitating agent is a multi-valent metal compound, the metal compound being a metal salt or a metallic coordination compound.

15. The liquid of claim 14 wherein the metallic coordination compound comprises a metal ion and a ligand.

16. The liquid of claim 15 wherein the ligand has a coordination number of at least two.

17. The liquid of claim 16 wherein the ligand is selected from the group consisting of glycine, ethylenediamine, propylenediamine, lactic acid, iminodiacetic acid, diethylenetriamine, dihydroxyethylglycine, hydroxyethyliminodiacetic acid, nitrilotriacetic acid, ethylenediaminetetraacetic acid, hydroxyethylethylenediaminetetraacetic acid, diethylenetriaminepentaacetic acid, and triethylenetetraminehexaacetic acid.

18. The liquid of claim 1 or 6 further comprising a colorant.

19. An ink-jet printing liquid set, the set comprising:
   a first aqueous liquid a decel-alleviating component and a precipitating agent which comprises $Mg^{+2}$ cations, wherein the decel-alleviating component is a liquid-soluble compound having a cationic component and an anionic component, the decel-alleviating component being capable of undergoing rapid thermal decomposition upon heating; and a second aqueous ink, the second ink comprising at least one second colorant having a functional group that upon contact with the precipitating agent in the first liquid can associate to form an insoluble salt, complex, or compound, thereby immobilizing the second colorant in the second.

20. The set of claim 19 wherein the wherein the thermal decomposition of the first liquid is exothermic.

21. The set of claim 19 herein the decel-alleviating component is a salt having a cationic component and an anionic component having oxidizing or reducing capabilities.

22. The set of claim 19 wherein the decel-alleviating component comprises a compound selected from the group consisting of $NH_4NO_3$, $NH_4NO_2$, $NH_4N_3$, $N_2H_5NO_3$, $N_2H_6(NO_3)_2$, $(NH_4)_2S_2O_8$.

23. The set of claim 19 wherein the decel-alleviating component is $NH_4NO_3$.

24. The set of claim 19, 22, or 23 wherein the decel-alleviating component is present in the liquid in an effective concentration from about 0.05 to about 0.1 wt. % based on the total ink weight.

25. The set of claim 19, 22, or 23 wherein the total concentration of the cation that is the same as that associated with the decel-alleviating component is in a range from about 0.01 to about 10%.

26. The set of claim 19, 22, or 23 wherein the total concentration of the anion that is the same as that associated with the decel-alleviating component is in a range from about 0.03 to about 20%.

27. The set of claim 19, 22, or 23 wherein the ratio of the total cations which are the same as the cationic component of the decel-alleviating component to the total anions which are same as the anionic component of the decel-alleviating component is about 1 to about 4.

28. A method for alleviating decel in an ink-jet printing, the method comprising the steps of:

providing a first aqueous liquid comprising a decel-alleviating component and a precipitating agent which comprises $Mg^{+2}$ cations, wherein the decel-alleviating component is a liquid-soluble compound having a cationic component and an anionic component, the decel-alleviating component being capable of undergoing rapid thermal decomposition upon heating.

29. The method of claim 28 wherein the decel-alleviating component comprises a compound selected from the group consisting of $NH_4NO_3$, $NH_4NO_2$, $NH_4N_3$, $N_2H_5NO_3$, $N_2H_6(NO_3)_2$, $(NH_4)_2S_2O_8$.

30. The method of claim 29 wherein the decel-alleviating component is $NH_4NO_3$.

* * * * *